US010684595B2

(12) United States Patent
Vaughn

(10) Patent No.: US 10,684,595 B2
(45) Date of Patent: Jun. 16, 2020

(54) CONTROL USER INTERFACE FOR TYING SYSTEM

(71) Applicant: ACCENT PACKAGING, INC., Tomball, TX (US)

(72) Inventor: Mark Allen Vaughn, Carthage, MO (US)

(73) Assignee: Accent Wire Holdings, LLC, Tomball, TX (US)

( * ) Notice: Subject to any disclaimer, the term of this patent is extended or adjusted under 35 U.S.C. 154(b) by 879 days.

(21) Appl. No.: 14/476,598

(22) Filed: Sep. 3, 2014

(65) Prior Publication Data

US 2015/0066214 A1 Mar. 5, 2015

Related U.S. Application Data

(60) Provisional application No. 61/873,662, filed on Sep. 4, 2013.

(51) Int. Cl.
*G05B 15/02* (2006.01)
*G05B 19/042* (2006.01)
(Continued)

(52) U.S. Cl.
CPC .......... *G05B 15/02* (2013.01); *G05B 19/042* (2013.01); *A01F 15/00* (2013.01); *B65B 13/00* (2013.01);
(Continued)

(58) Field of Classification Search
None
See application file for complete search history.

(56) References Cited

U.S. PATENT DOCUMENTS 25,783 A 10/1859 White
1,460,649 A 7/1923 Gerrard
(Continued)

FOREIGN PATENT DOCUMENTS

CN 2050497 U 1/1990
CN 2451488 Y 10/2001
(Continued)

OTHER PUBLICATIONS

"AWG Copper Wire Size and Data Table Chart @ 100 Degrees F", Feb. 1, 2001, Engineers Edge. (Year: 2001).*
(Continued)

*Primary Examiner* — Qing Yuan Wu
(74) *Attorney, Agent, or Firm* — Ira Domnitz

(57) ABSTRACT

Systems, methods, and user interfaces for controlling a bulk material baling system are provided. One embodiment of the invention relates to a user interface for controlling components of a tying system, providing a wire odometer that determines and displays real-time information on the use of consumables by the tying system, such as an amount of remaining wire. Embodiments of the wire odometer simultaneously monitor and display an amount of remaining wire on a wire carrier, and a corresponding number of straps remaining to be tied by the current wire carrier. Further embodiments of the user interface provide monitoring data and remaining-use expectancy indicators for individual system components. Additional embodiments of the user interface are configured to control various features of components of a combination tying system that straps bailed material with alternate tying heads, providing both wire strapping and plastic strapping capabilities.

6 Claims, 21 Drawing Sheets

(51) Int. Cl.
*G06F 3/048* (2013.01)
*G06F 3/01* (2006.01)
*A01F 15/00* (2006.01)
*B65B 13/02* (2006.01)
*B65B 13/00* (2006.01)

(52) U.S. Cl.
CPC .... *B65B 13/02* (2013.01); *G05B 2219/13144* (2013.01); *G05B 2219/23258* (2013.01); *G05B 2219/32128* (2013.01); *G05B 2219/35488* (2013.01); *G05B 2219/40099* (2013.01); *G06F 3/016* (2013.01); *G06F 3/048* (2013.01); *G06F 2206/1008* (2013.01)

(56) References Cited

U.S. PATENT DOCUMENTS

| | | |
|---|---|---|
| 1,868,141 A | 7/1932 | Harvey |
| 1,939,746 A | 12/1933 | Whitman |
| 2,756,783 A | 7/1956 | Osuch |
| 2,853,885 A | 9/1958 | Seltzer |
| 2,859,687 A | 11/1958 | Hill |
| 2,907,356 A | 10/1959 | Miille |
| 2,922,359 A | 1/1960 | Brouse et al. |
| 2,963,958 A | 12/1960 | Nelson et al. |
| 3,037,534 A | 6/1962 | Brouse |
| 3,037,535 A | 6/1962 | Linehan et al. |
| 3,086,450 A | 4/1963 | Tarbox |
| 3,099,204 A | 7/1963 | Stromberg |
| 3,232,216 A | 2/1966 | Enstad et al. |
| 3,251,296 A | 5/1966 | Smith |
| 3,295,436 A | 1/1967 | Dalton et al. |
| 3,327,618 A | 6/1967 | Cook |
| 3,338,273 A | 8/1967 | Kalning |
| 3,447,448 A | 6/1969 | Pasic |
| 3,880,204 A | 4/1975 | Sarff et al. |
| 3,888,134 A | 6/1975 | Miranda et al. |
| 3,889,584 A | 6/1975 | Wiklund-Bergeforsen et al. |
| 4,079,667 A | 3/1978 | Lems |
| 4,114,527 A | 9/1978 | O'Neill |
| 4,164,176 A | 8/1979 | Brouse et al. |
| 4,177,842 A | 12/1979 | Dilley |
| 4,252,157 A | 2/1981 | Ohnishi |
| 4,302,991 A | 12/1981 | Brouse et al. |
| 4,403,542 A | 9/1983 | Lewis |
| 4,566,378 A | 1/1986 | Fleissner |
| 4,577,554 A | 3/1986 | Brouse |
| 4,587,791 A | 5/1986 | Brouse et al. |
| 4,611,534 A | 9/1986 | Kudlicka |
| 4,655,264 A | 4/1987 | Dilley |
| 4,730,434 A | 3/1988 | Knudsen |
| 4,739,700 A | 4/1988 | Brouse et al. |
| 4,817,519 A | 4/1989 | Brouse et al. |
| 4,827,991 A | 5/1989 | Jacobsen et al. |
| 5,078,057 A | 1/1992 | Pearson |
| 5,392,821 A | 2/1995 | Chudy |
| 5,433,255 A | 7/1995 | Wiedel |
| 5,467,804 A | 11/1995 | Kupferschmidt et al. |
| 5,494,081 A | 2/1996 | Wiedel |
| 5,577,760 A | 11/1996 | Pressler |
| 5,704,283 A | 1/1998 | Wiedel |
| 5,870,950 A | 2/1999 | Wiedel |
| 5,921,289 A | 7/1999 | Johnson |
| 6,009,646 A | 1/2000 | Johnson |
| 6,032,575 A | 3/2000 | Johnson |
| 6,283,017 B1 | 9/2001 | Johnson et al. |
| 6,363,843 B1 | 4/2002 | Daniel et al. |
| 6,571,691 B1 | 6/2003 | Jones |
| 6,640,700 B2 | 11/2003 | Helland et al. |
| 6,745,677 B2 | 6/2004 | Pearson et al. |
| 6,755,123 B2 | 6/2004 | Flaum et al. |
| 6,857,252 B2 | 2/2005 | Haberstroh |
| 6,920,741 B2 | 7/2005 | Devine |
| 6,923,113 B2 | 8/2005 | Bobren et al. |
| 6,957,835 B2 | 10/2005 | Rotole |
| 6,962,109 B2 | 11/2005 | Bobren et al. |
| 6,968,779 B2 | 11/2005 | Doyle et al. |
| 6,975,911 B2 | 12/2005 | Stamps et al. |
| 7,085,625 B2 | 8/2006 | Timothy et al. |
| 7,124,679 B2 | 10/2006 | Daniel et al. |
| 7,146,294 B1 | 12/2006 | Waitkus |
| 7,373,877 B2 | 5/2008 | Wiedel |
| 7,380,574 B2 | 6/2008 | Wiedel |
| 8,397,632 B2 | 3/2013 | Millett et al. |
| 8,757,055 B2 | 6/2014 | Millett et al. |
| 2003/0024404 A1 | 2/2003 | Daniel et al. |
| 2004/0144264 A1 | 7/2004 | Daniel et al. |
| 2006/0042477 A1 | 3/2006 | Daniel et al. |
| 2006/0042478 A1 | 3/2006 | Daniel et al. |
| 2009/0250930 A1 | 10/2009 | Eylenbosch et al. |
| 2013/0019764 A1 | 1/2013 | Yang |
| 2013/0180416 A1 | 7/2013 | Stein et al. |
| 2013/0247515 A1 | 9/2013 | Actis |
| 2015/0379785 A1* | 12/2015 | Brown, Jr. ........... A01B 79/005 701/29.1 |

FOREIGN PATENT DOCUMENTS

| | | |
|---|---|---|
| CN | 2527767 Y | 12/2002 |
| GB | 325783 A | 5/1930 |
| GB | 417803 A | 10/1934 |
| GB | 420098 A | 11/1934 |
| GB | 474813 A | 11/1937 |
| GB | 704931 A | 3/1954 |
| GB | 984251 A | 2/1965 |

OTHER PUBLICATIONS

Australian Office Action dated Apr. 1, 2016 in Application No. 2012302002, 3 pages.
Non-Final Office Action dated Sep. 10, 2015 in U.S. Appl. No. 14/185,524, 10 pages.
Non-Final Office Action dated Sep. 11, 2015 in U.S. Appl. No. 14/202,407, 10 pages.
Chinese Office Action dated Feb. 28, 2015 in Application No. 201280052589.9, 16 pages.
European Search Report dated Apr. 3, 2015 in Application No. 12827753.0, 5 pages.
International Search Report with Written Opinion dated May 22, 2015 in Application No. PCT/US2015/015382, 11 pages.
"Samuel Strappiing Systems. The Science of Strap Selection. Handbook [online]. Oct. 2, 2012 (Oct. 2, 2012) [retrieved on May 20, 2015]. Retrieved from the Internet:<URLhttp://www. thomasnet. com/white-papers/abstract/1 01792/the-science-of-strap-selection. html>".
International Search Report with Written Opinion dated Jun. 4, 2015 in Application No. PCT/US2015/019446, 11 pages.
European Office Action dated Feb. 2, 2016 in Application No. 12827753, 4 pages.
International Preliminary Report on Patentability dated Mar. 17, 2016 in Application No. PCT/US15/19446, 15 pages.
International Preliminary Report on Patentability dated Mar. 17, 2016 in Application No. PCT/US2014/053986, 7 pages.
Notice of Allowance dated Feb. 8, 2016 in U.S. Appl. No. 14/202,407, 8 pages.
International Search Report with Written Opinion dated May 12, 2011 in Application No. PCT/US2011/026856, 7 pages.
Brian Taylor, "Fit to be tied: the right wire-tying system conserves costs while keeping bales in ship-shape," Baler Focus, Recycling Today, Feb. 2003, 5 pages.
"Bundling Demand Met by ISB," Converter the International Technical Publication for the Paper, Board, Film and Foil Converter, Jul. 2003, vol. 40, Issue 7, p. 20, 2 pages.
Cranston Machinery Co., Inc., Oak Grove, Oregon, 1000 Series Wire Strapper, 25 pages (Excerpts from Manual). Sep. 1996.
Non-Final Office Action dated Aug. 2, 2011 in U.S. Appl. No. 12/717,616, 11 pages.
Final Office Action dated Dec. 28, 2011 in U.S. Appl. No. 12/717,616, 9 pages.

(56) References Cited

OTHER PUBLICATIONS

Non-Final Office Action dated Jun. 12, 2012 in U.S. Appl. No. 12/717,616, 6 pages.
International Search Report with Written Opinion dated Nov. 20, 2012 in Application No. PCT/US2012/052869, 6 pages.
Notice of Allowance dated Nov. 23, 2012 in U.S. Appl. No. 12/717,616, 9 pages.
Non-Final Office Action dated Aug. 1, 2013 in U.S. Appl. No. 13/220,798, 16 pages.
Non-Final Office Action dated Aug. 27, 2013 in U.S. Appl. No. 13/753,188, 6 pages.
Final Office Action dated Feb. 4, 2014 in U.S. Appl. No. 13/220,798, 16 pages.
Notice of Allowance dated Feb. 11, 2014 in U.S. Appl. No. 13/753,188, 8 pages.
Non-Final Office Action dated Jun. 20, 2014 in U.S. Appl. No. 13/220,798, 15 pages.
Notice of Allowance dated Nov. 13, 2015 in U.S. Appl. No. 14/185,524, 8 pages.
Non-Final Office Action dated Feb. 13, 2015 in U.S. Appl. No. 14/263,483, 8 pages.
International Search Report with Written Opinion dated Jan. 27, 2015 in Application No. PCT/US2014/053986, 11 pages.
Notice of Allowance dated Feb. 2, 2015 in U.S. Appl. No. 13/220,798, 8 pages.
Notice of Allowance dated Mar. 11, 2015 in U.S. Appl. No. 14/263,483, 8 pages.

\* cited by examiner

FIG. 15.

CONTROL USER INTERFACE FOR TYING SYSTEM

CROSS-REFERENCE TO RELATED APPLICATIONS

This application claims priority to U.S. Provisional Application No. 61/873,662, filed Sep. 4, 2013, entitled "Control User Interface for Tying System," the entire disclosure of which is hereby incorporated by reference.

STATEMENT REGARDING FEDERALLY SPONSORED RESEARCH OR DEVELOPMENT

None.

TECHNICAL FIELD

The present invention generally relates to a control user interface (UI) for a tying system. In further embodiments, the invention is directed to a control system and/or control UI that determines and/or displays a number of straps remaining and a status of one or more functions of a plastic and/or wire tying system during use.

BACKGROUND OF THE INVENTION

Traditional bulk-material baling systems, such as wire-tying systems, incorporate a Programmable Logic Controller (PLC) to control one or more components. For example, the various components of a knotter assembly for gripping and twisting two wires may be controlled, at least in part, by commands communicated through the PLC. In addition to receiving commands from an operator of the system, the PLC may also output data regarding the operation of the device, such as error messages, cycle number, and the like, for display on a control screen. However, challenges are presented by the limited number of characters displayed on a screen coupled to the PLC, which provides a minimal amount of control data for a user operating the device as well as limited real-time interaction with the current operation of the tying system. In addition to the limitations of the PLC's minimal screen display, current bulk-material baling systems provide limited insight into the use of consumable materials during operation, and to the overall functioning and/or wearing of individual parts of the system.

Accordingly, embodiments of the present invention introduce technology for resolving the above-mentioned issues conventionally experienced when operating and controlling bulk-material baling systems.

BRIEF SUMMARY OF THE INVENTION

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Embodiments of the present invention relate broadly to innovative systems, methods, and control UI's for controlling one or more components of a bulk material bailing system. For example, embodiments of the invention relate to a control system/UI for controlling components of a tying system, providing real-time information on the use of consumables by the tying system, and generating monitoring data and remaining-use expectancy indicators for tying system components. In one embodiment, the UI is configured to control components of a wire-tying system, such as a knotter assembly described in U.S. patent application Ser. No. 13/220,798, filed Aug. 30, 2011 (Patent Application Publication Number 2012/0012013), and U.S. Pat. No. 8,397,632, issued Mar. 19, 2013, which are hereby incorporated by reference in their entirety. In another embodiment, the UI is configured to control components of a combination tying system that straps baled material with alternate tying heads, providing both wire strapping and plastic strapping capabilities. Further, embodiments of the invention relate to a UI coupled to a computing device for controlling a tying system.

Embodiments of the innovative UI include selection indicators (e.g., "buttons" on a touch screen) that correspond to the relevant and/or available operations for controlling the tying system, such as the corresponding relevant selection indicators for manual mode and/or automatic mode. In some embodiments, the control system/UI includes a "wire odometer" that determines and displays how much wire is left on a wire carrier providing wire to the wire-tying system (i.e., wire inventory data). As such, the innovative methods include simultaneously monitoring and displaying an amount of remaining wire on a wire carrier.

In embodiments, the UI provides indicators of remaining-use expectancy for individual components in the tying system, such as the usage of high-wear parts based on the individual "life expectancy" of each part. In a further embodiment, the control system for the wire-tying device provides an email notification to a remote user. The email notification may include system-monitoring data such as a notification of an error code with a time stamp, high-wear parts usage information, and/or wire inventory data.

In one embodiment, the UI displays machine diagnostic data for troubleshooting, which may include a graphical indicator of a location on the tying system where an error is occurring. In a further embodiment, the UI is accessible remotely from a computing device not directly coupled to the tying system such that the functioning of the tying system may be monitored and/or controlled remotely and relevant use data may be remotely retrieved.

Accordingly, in one embodiment of the invention, a wire odometer user interface for monitoring a wire-tying system is provided. The wire odometer user interface includes: a carrier weight indicator; at least one strap count indicator; and an estimated length indicator, wherein the estimated length indicator provides an indication of a calculated length of remaining wire on a wire carrier coupled to the wire-tying system. In some embodiments, the carrier weight indicator includes weight information manually entered by a user. In further embodiments, the carrier weight indicator includes real-time weight information received from a weighing apparatus coupled to the wire-tying system. In some aspects, the at least one strap count indicator includes a first strap count indicator for a first user, and in further aspects, it includes a second strap count indicator for a second user. As such, the calculated length of remaining wire on a wire carrier coupled to the wire-tying system may be determined based at least in part on: (1) the carrier weight indicator; (2) a wire gauge of the wire on the wire carrier; and (3) a bale perimeter length for a bale size currently being processed by the wire-tying system.

In another aspect of the invention, a user interface for controlling a bulk material baling system includes a wire odometer display configured to present an amount of remaining wire on a carrier coupled to the baling system, and a parts monitoring display configured to present remaining use expectancy indicators corresponding to at least one part coupled to the baling system. In some aspects, the amount of remaining wire is determined based at least in part on 1) a carrier weight indicator, 2) a wire gauge of the remaining wire on the carrier, and 3) a bale perimeter length. In further aspects, the remaining use expectancy indicators are determined based at least in part on 1) an identified expectancy corresponding to the at least one part, and 2) a cycle number.

In yet another embodiment, a method of determining an amount of remaining wire on a carrier coupled to a wire-tying system is provided. The method includes: receiving an indication of a carrier weight at a first time; receiving an indication of a bale perimeter length; receiving an indication of a wire gauge; based on the indication of the carrier weight at the first time, the indication of the bale perimeter length, and the indication of the wire gauge, determining an amount of remaining wire on the carrier a the first time; and presenting the determined amount of remaining wire on the carrier at the first time on a wire odometer user interface. In some aspects, the method also includes receiving an indication of a carrier weight at a second time; based on the indication of carrier weight at the second time, the indication of the bale perimeter length, and the indication of the wire gauge, determining an amount of remaining wire on the carrier at the second time; and presenting the determined amount of remaining wire on the carrier at the second time on the wire odometer user interface. In one embodiment, the determined amount of remaining wire is used to determine a remaining strap count. In another aspect of the invention, the user interface for a baler strapping system includes: a touchscreen; an electronic interface between the touchscreen and a first strapping head on a baler; and an electronic interface between the touchscreen and a second strapping head on the baler.

In a further embodiment of the invention, a UI for a baler strapping system is provided. The UI includes a touchscreen; an electronic interface between the touchscreen and a first strapping head on a baler; and an electronic interface between the touchscreen and a second strapping head on the baler.

In another aspect of the invention, a control system user interface for controlling a wire-tying system is provided. The control system user interface includes: a carrier weight indicator; a remaining wire length indicator; and a straps remaining indicator, wherein the straps remaining indicator corresponds to a calculated number of straps remaining on a wire carrier coupled to the wire-tying system.

In a further aspect of the invention, a user interface for controlling a bulk material baling system is provided. The user interface includes: a wire odometer display configured to present an amount of remaining wire on a carrier coupled to the baling system; and a parts monitoring display configured to present remaining use expectancy indicators corresponding to at least one part coupled to the baling system.

In yet another aspect, embodiments of the invention are directed to a control system for operating a material strapping device. The control system includes a control system component having one or more processors and one or more computer storage media, wherein the control system component: determines a number of straps remaining on a wire carrier of the material strapping device, and identifies an amount of life remaining for at least one part coupled to the material strapping device.

BRIEF DESCRIPTION OF THE SEVERAL VIEWS OF THE DRAWINGS

In the accompanying drawings, which form a part of the specification and which are to be read in conjunction therewith, and in which like reference numerals are used to indicate like parts in the various views:

FIG. 15 is a display screen of an exemplary control user interface including a maintenance monitoring display, in accordance with an embodiment of the present invention;

DETAILED DESCRIPTION OF THE INVENTION

Generally, embodiments of the present invention relate broadly to innovative systems, methods, and UIs for controlling one or more components of a bulk material bailing system. For example, embodiments of the invention relate to a control system and/or control UI for controlling components of a tying system, generating real-time information on the use of consumables by the tying system, and providing monitoring data and remaining-use expectancy indicators for tying system components. In one embodiment, the control UI is configured to control components of a wire-tying system, such as a knotter assembly for gripping and twisting two wires. In another embodiment, the UI is configured to control components of a combination tying system that straps bailed material with alternate tying heads, providing both wire strapping and plastic strapping capabilities.

Embodiments of the innovative control UI include selection indicators (e.g., "buttons" on a touch screen) that correspond to the relevant and/or available operations, such as the corresponding relevant selection indicators for manual mode or automatic mode. In some embodiments, the control UI includes a "wire odometer" that determines and displays how much wire is left on a wire carrier providing wire to the wire-tying system (i.e., wire inventory data). As such, the innovative system, method, and control UI includes features configured to simultaneously monitor and display an amount of remaining wire on a wire carrier.

In embodiments, the control UI provides indicators of remaining-use expectancy for individual components in the system, such as the usage of high-wear parts based on the individual "life expectancy" of each part. In a further embodiment, the control system for the wire-tying system provides an email notification to a remote user. The email notification includes system-monitoring data such as a notification of an error code with a time stamp, high-wear parts usage information, and/or wire inventory data.

In one embodiment, the control UI displays machine diagnostic data for troubleshooting, which may include a graphical indicator of a location on the tying system where an error is occurring. In a further embodiment, the control UI is accessible remotely from a computing device not directly coupled to the tying system, such that the functioning of the control system and corresponding tying system may be monitored and/or controlled remotely and relevant use data may be remotely retrieved.

Figure 1:
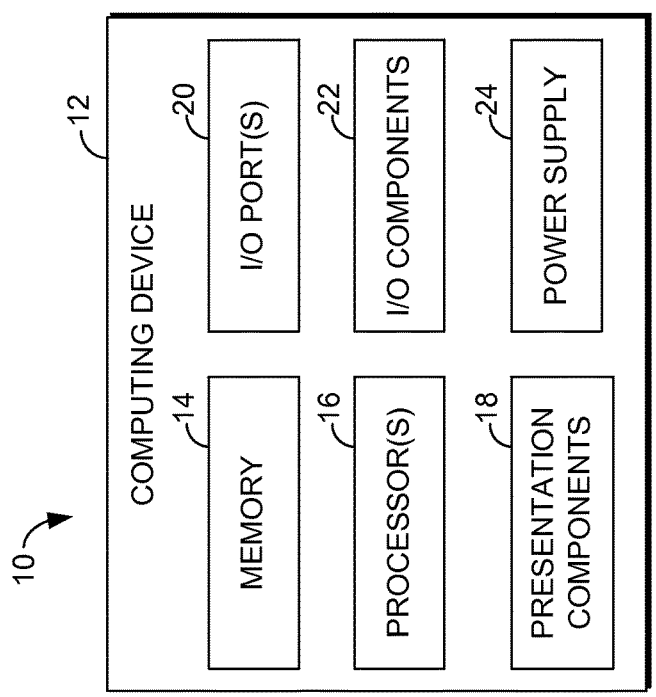
FIG. 1 is an exemplary computing device for executing embodiments of the present invention.

With reference initially to the exemplary system 10 of FIG. 1, a computing device 12 is depicted for implementing embodiments of the invention. In one aspect, computing device 12 may be used to execute one or more embodiments of the present invention. Computing device 12 is but one example of a suitable computing environment and is not intended to suggest any limitation as to the scope of use or functionality of embodiments of the invention. Neither should the computing device 12 be interpreted as having any dependency or requirement relating to any one component or any combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules include routines, programs, objects, components, data structures, and the like, and/or refer to code that performs particular tasks or implements particular abstract data types. Embodiments of the invention may be practiced in a variety of system configurations, including handheld devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, the computing device 12 includes one or more of the following devices, which may be directly or indirectly coupled, according to embodiments of the invention: a memory 14, one or more processors 16, one or more presentation components 18, one or more input/output (I/O) ports 20, one or more I/O components (22), and an illustrative power supply 24. In embodiments, one or more busses may directly or indirectly couple one or more devices of the computing device 12. Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventor hereof recognizes that such is the nature of the art, and reiterates that the diagram of FIG. 1 is merely illustrative of an exemplary computing device 12 that can be used in connection with one or more embodiments of the present invention. Distinction is not made between such categories as "workstation," "server," "laptop," "handheld device," etc., as all are contemplated within the scope of FIG. 1 and reference to "computing device."

The computing device 12 typically includes a variety of computer-readable media. Computer-readable media may be any available media that is accessible by the computing device 12 and includes both volatile and nonvolatile media, removable and non-removable media. Computer-readable media comprises computer storage media and communication media, computer storage media excluding signals per se. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium that can be used to store the desired information and that can be accessed by computing device 12.

Communication media, on the other hand, embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

The memory 14 includes computer storage media in the form of volatile and/or nonvolatile memory. The memory 14 may be removable, non-removable, or a combination thereof. Exemplary hardware devices include solid-state memory, hard drives, optical-disc drives, and the like. The computing device 12 includes one or more processors 16 that read data from various entities such as the memory 14 or the I/O components 22. The presentation component(s) 18 presents data indications to a user or other device. Exemplary presentation components include a display device, speaker, printing component, vibrating component, and the like.

The I/O ports 20 allow the computing device 12 to be logically coupled to other devices including the I/O components 22, some of which may be built in. Illustrative I/O components include a microphone; joystick; game pad; satellite dish; scanner; printer; wireless device; a controller, such as a stylus, a keyboard and a mouse; a natural user interface (NUI); and the like.

Aspects of the subject matter described herein may be described in the general context of computer-executable instructions, such as program modules, being executed by a computing device 12. Generally, program modules include routines, programs, objects, components, data structures, and so forth, which perform particular tasks or implement particular abstract data types. Aspects of the subject matter described herein may also be practiced in distributed computing environments where tasks are performed by remote-processing devices that are linked through a communications network. In a distributed computing environment, program modules may be located in both local and remote computer storage media including memory storage devices. In embodiments, the system may include a database (not shown) configured to provide storage of and/or access to one or more items of data via the network.

Figure 2:
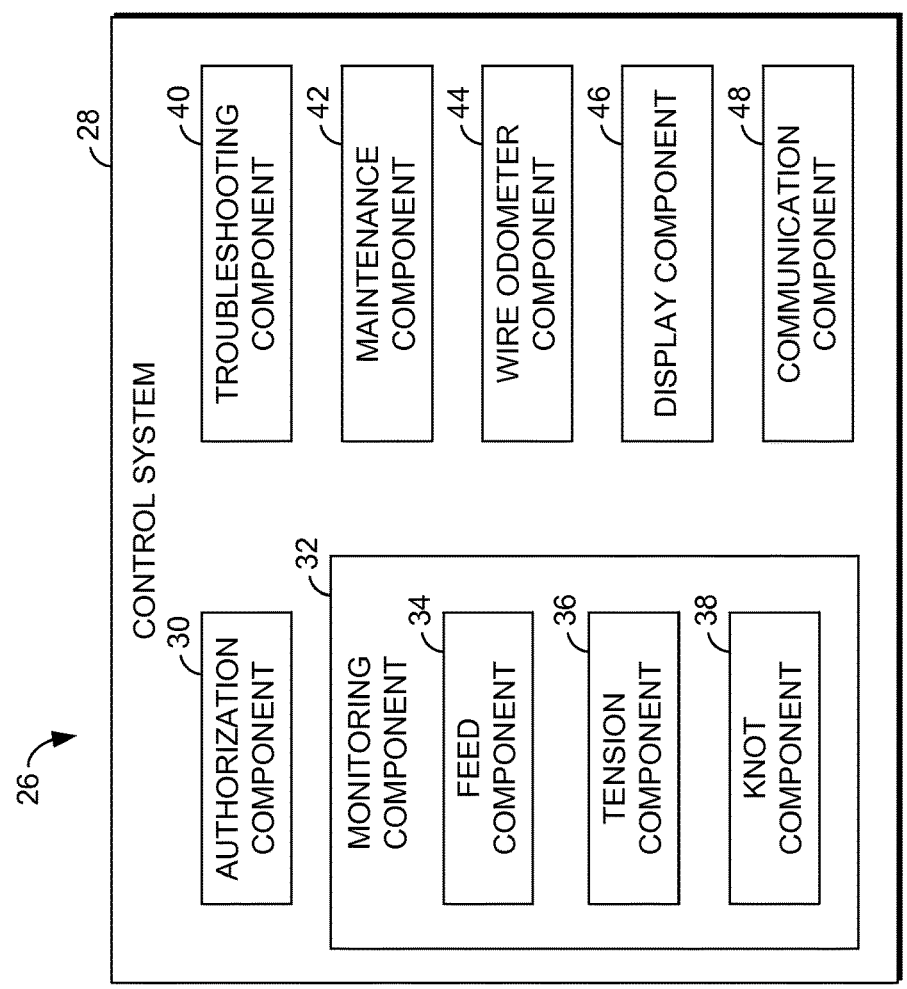
FIG. 2 is a exemplary control system for operating a material strapping device, in accordance with an embodiment of the present invention.

Turning now to FIG. 2, embodiments of the invention include an exemplary system 26 for generating and/or executing a control system user interface for a wire tying system. In one aspect, the exemplary control system 28 for operating a material strapping device is provided in accordance with an embodiment of the present invention. As shown in the example of FIG. 2, the control system 28 includes one or more authorization components 30, one or more monitoring components 32, one or more troubleshooting components 40, one or more maintenance components 42, one or more wire odometer components 44, one or more display components 46, and/or one or more communication components 48. It will be understood by those of ordinary skill in the art that the components and modules illustrated in FIG. 2 are exemplary in nature and in number, and should not be construed as limiting. Any number of components and/or modules may be employed to achieve the functionality described herein. For example, any number of computing devices 12 embodying one or more features of a control system 28 may be employed by the wire tying system within the scope of embodiments hereof. Further, components and/or modules may be located on any number of computing devices 12. Each component and/or module may comprise a single device and/or interface or multiple devices and/or interfaces cooperating in a distributed environment. Further, multiple components and/or modules may include the various components of control system 28 that collectively perform the tasks of embodiments of the invention. For example, multiple devices arranged in a distributed computing environment may collectively provide the monitoring component 32 features described herein. In another example, the monitoring component 32 may be provided on a single server, a cluster of servers, or a computing device, such as the computing device 12, remote from one or more of the remaining components. In some instances, the control system 28, or at least a portion of components included therein, is provided at the computing device 12. Other components and/or modules not shown may also be included within the system 26.

In some embodiments, one or more of the illustrated components and/or modules may be implemented as stand-alone applications. In further embodiments, one or more of the illustrated components and/or modules may be implemented via a computing device (e.g., the computing device 12), as an Internet-based service and/or as a module within the control system 28. The phrase "application" or "service" as used herein may broadly refer to any software, or portions of software, that run on top of, or access storage locations within, a computing device 12 and/or multiple computing devices 12.

It should be understood that this and other arrangements described herein are set forth only as examples. Other arrangements and elements (e.g., machines, interfaces, functions, orders, and/or groupings of functions) can be used in addition to, or instead of, those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions, including the functions described below with respect to the control system 28, may be carried out by a processor executing instructions stored in memory.

Figure 5A:
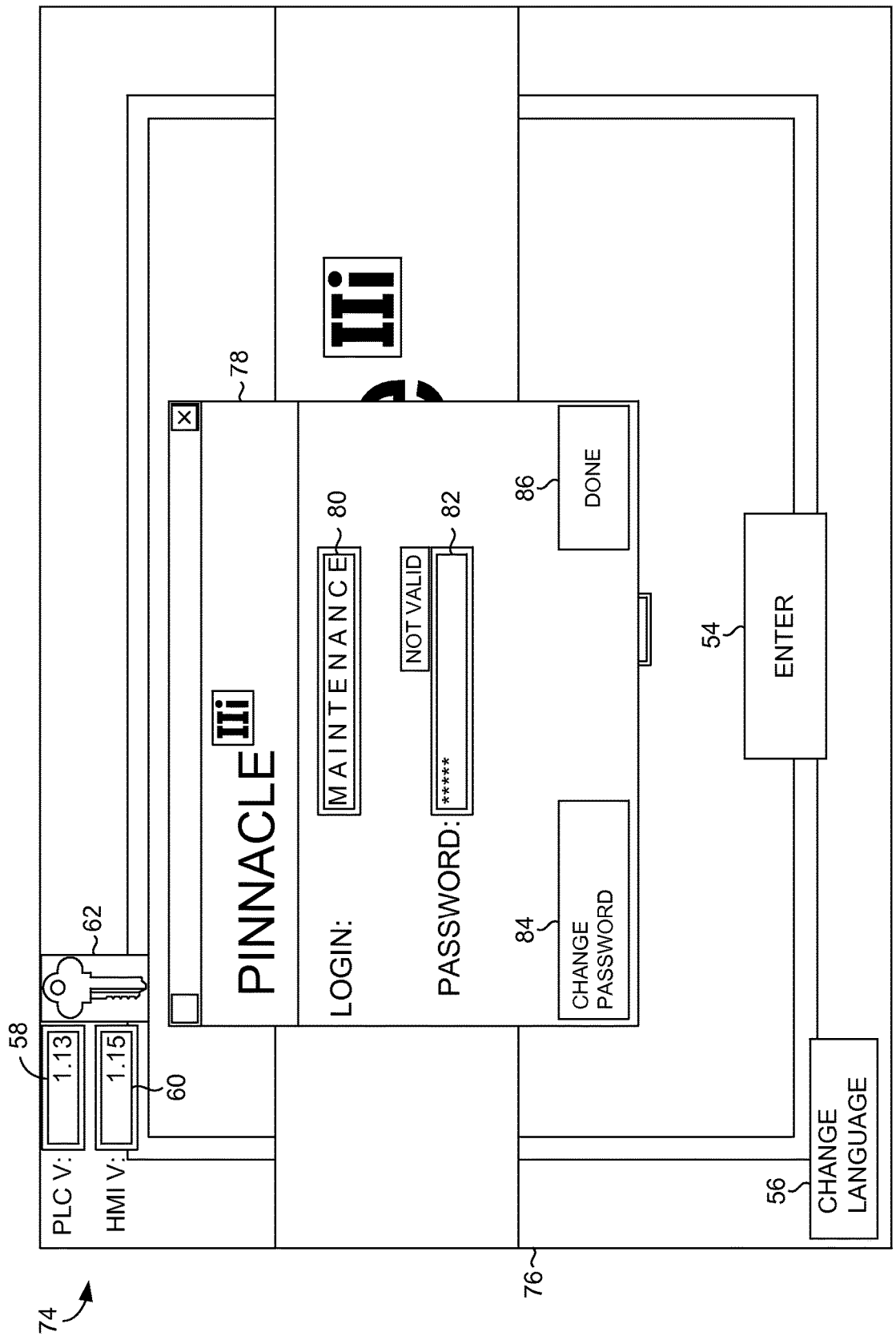
FIG. 5A is a display screen of an exemplary control user interface with an authorization window for user login, in accordance with an embodiment of the invention.

Returning to the exemplary components of control system 28 in FIG. 2, the authorization component 30 may be configured to determine access rights and/or controls for a particular user based on a login, such as the login depicted in FIG. 5A. In one aspect, an authorization component determines, based on a user's input user name and/or password, whether the user is authorized to run the control system, alter any features of the control UI, manipulate various functions of the different control components, and the like.

In further embodiments, the monitoring component 32 may include a feed component 34, a tension component 36, and a knot component 38. As such, various components and/or combination of components associated with the monitoring component 32 may be configured to monitor a status of one or more activities of a wire tying system, such as a status of a wire being fed through the system, a status of the tensioning of such wire, and the status of a knotter feature applied to such wire strap, based on data received and/or accessed by the feed component 34, the tension component 36, and/or the knot component 38.

In the example of FIG. 2, a troubleshooting component 40 of the control system 28 may be configured to determine a location of a fault within a wire tying system, identify one or more possible causes of a detected fault within a tying system, direct a user to a particular part causing an error/fault, and the like. Similarly, the maintenance component 42 may be configured to provide an indication to a user of a particular maintenance status of one or more features of a wire tying system that may affect the user's operation of the control system 28. In further embodiments, the wire odometer component 44 may be configured to generate and/or determine an amount of remaining straps for tying with a current wire carrier coupled to the wire tying system, based on a weight of the carrier and a usage of the wire during sequential cycles of strapping. For example, the wire odometer content generated by wire odometer component 44 may be displayed as part of a run screen UI (as part of a straps remaining indicator) and/or via a wire odometer display, such as the wire odometer discussed below with reference to FIG. 12.

Control system 28 may further include a display component 46 for displaying one or more features of the control system 28 to a user via a control UI, such as a touchscreen control UI on a presentation component 18 of a computing device 12. In one embodiment, the display component 46 is configured to generate one or more control UI's for presentation on a touchscreen device coupled to a wire tying system. As such, the touchscreen device may receive controls via the control UI for presentation to an operator of the wire tying system. In further embodiments, the control system 28 includes a communication component 48 configured to communicate one or more items of data to an external component, such as a remote control component (e.g., a supervisor's computing device in a remote location from the wire tying system). As such, one or more of the features provided by the control system 28, such as the wire odometer features of wire odometer component 44, the troubleshooting features of troubleshooting component 40, and/or the maintenance features of the maintenance component 42, may be remotely retrieved and/or controlled via at least the communication component 48.

Figure 3:
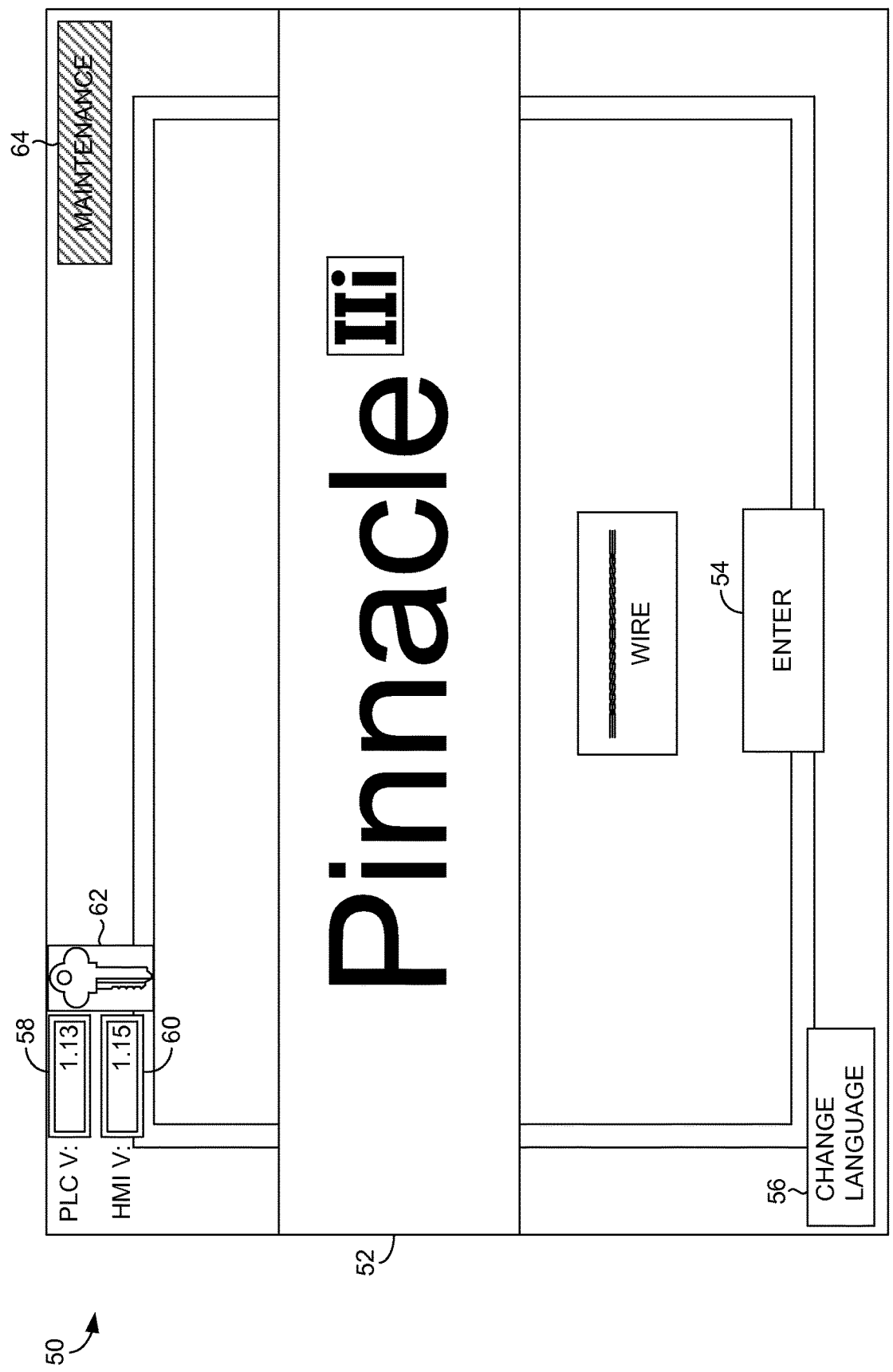
FIG. 3 is a display screen of an exemplary control user interface for a wire tying system, in accordance with an embodiment of the present invention.

With reference now to FIG. 3, a display screen of an exemplary control user interface (UI) 50 for a wire tying system is provided in accordance with an embodiment of the present invention. In one embodiment, the UI 50 includes a startup display 12 having a wire-mode selection indicator 54. As used herein, a "selection indicator" refers to an indicator of a user selection and/or a button or selectable icon on a display screen for user interaction with the control system via the UI. For example, for an exemplary startup display 52 having a touchscreen surface, each selectable indicator is a virtual "button" for user selection.

With continued reference to FIG. 3, the startup display 52 includes a language selection indicator 56 for receiving an indication from a user to change a display language on the UI 50, a programmable logic controller (PLC) version indicator 58 for indicating a most recent version of the PLC associated with the control UI, a human machine interface (HMI) indicator 60 (i.e., touchscreen version indicator) for indicating a most recent version of the HMI software, a login indicator 62 for initiating a log-in process with the control system, and an inactive maintenance indicator 64 to indicate whether a user is logged into the control system as a system operator or as a maintenance user. In some aspects, the PLC version indicator 58 provides an indication of one or more items of information associated with the PLC of a tying system, while the HMI version indicator provides an indication of one or more items of information associated with the HMI of the touchscreen UI.

Figure 4:
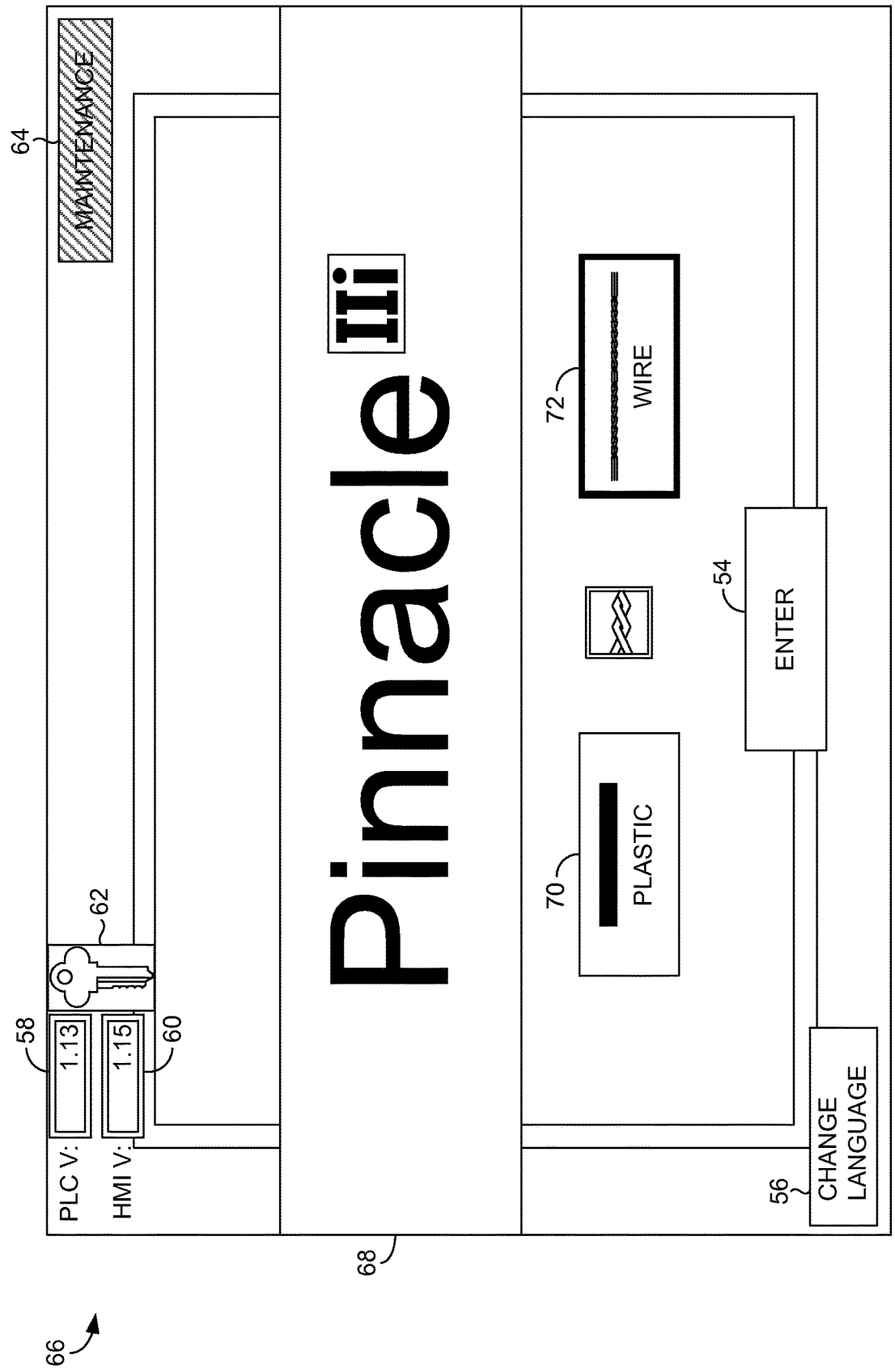
FIG. 4 is a display screen of an exemplary control user interface for a wire or plastic tying system, in accordance with an embodiment of the present invention.

In various embodiments of the invention, as illustrated in FIG. 4, the control system components, methods and/or user interfaces of the present invention may be used to control a wire-tying system, a plastic-tying system, and/or a combination tying system that couples a baling mechanism to a two-headed tying system providing a wire strapper and a plastic strapper. As such, the UI 66 of FIG. 4 includes a startup display 68 having both a plastic mode selection indicator 70 and a wire mode selection indicator 72. In response to selection of either the plastic mode selection indicator 70 or the wire mode selection indicator 72, a user may then select the enter command 54 to proceed with either plastic or wire strapping. In one embodiment, the startup display 52 may include multiple enter command 54 indicators, which correspond to multiple wire-tying machines configured to interact with the control UI and/or control system.

Upon selection of the login indicator 62, such as via selection of login indicator 62 on the startup display 76 of UI 74 in FIG. 5A, an authorization window 78 is provided for user login. In one aspect of the invention, various features of the control system may be activated and/or deactivated based on one or more control features associated with a particular user (i.e., the user identified from an authentication process via login indicator 62. For example, a key code input in response to selection of the login indicator 62 may provide access to enter the control system in a maintenance mode. As shown in FIG. 5A, the exemplary authorization window 78 may include a user login input 80, a password input 82, a change password indicator 84, and/or a completion indicator 86. In one aspect of the invention, a particular user having particular login credentials may utilize the authorization window 78 to grant access to specific features of the control system of the present invention. In some aspects, a corresponding indicator of a particular user may be provided as part of the UI 74, such as an indicator of a controls system operator, a maintenance operator, and/or a technician in association with the login input 80 identity. As such, the control UI 74 may be configured to include one or more user-specific items of content. In one embodiment, a control system user may enter a password via the login indicator 62 and enable the entering of a variety of settings, such as re-setting values within one or more settings of the control UI. In other embodiments, a user entering the control UI via a particular username and password (i.e., a pre-set key), a particular set of pre-determined values may be populated throughout various control UI's of the control system.

Figure 5B:
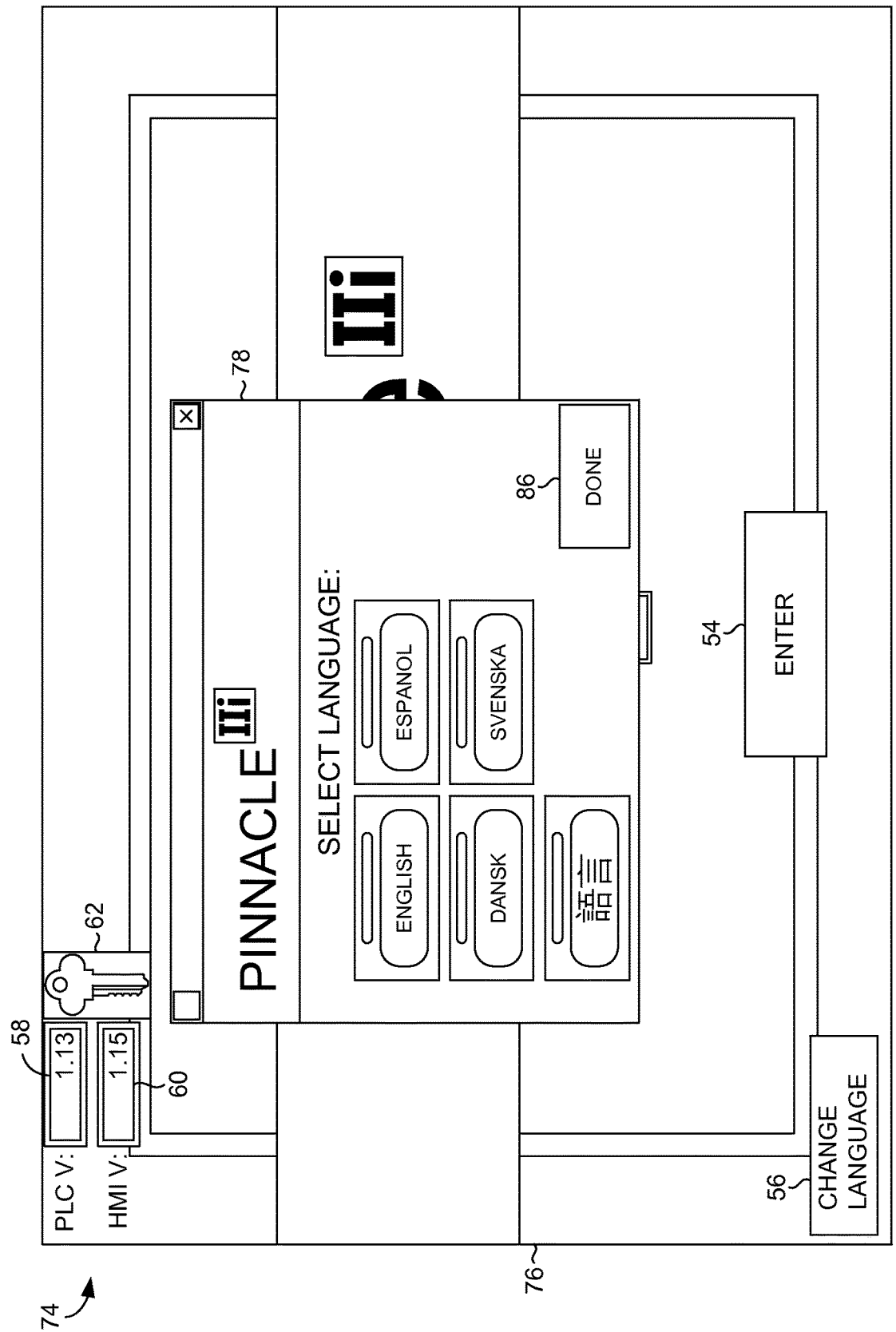
FIG. 5B is a display screen of an exemplary control user interface with a language selection window for changing a display language, in accordance with an embodiment of the invention.

Similarly, upon selection of the change language indicator 56 on the startup display 76 of the UI 74 in FIG. 5B, a language selection window 78 may be presented to a user of the control UI for selection and/or changing of the control UI features to one of multiple different languages, as indicated by completion indicator 86. In some aspects, a changed language indication received via selection window 78 corresponds to a changed language presented on each control UI of the control system.

Figure 6:
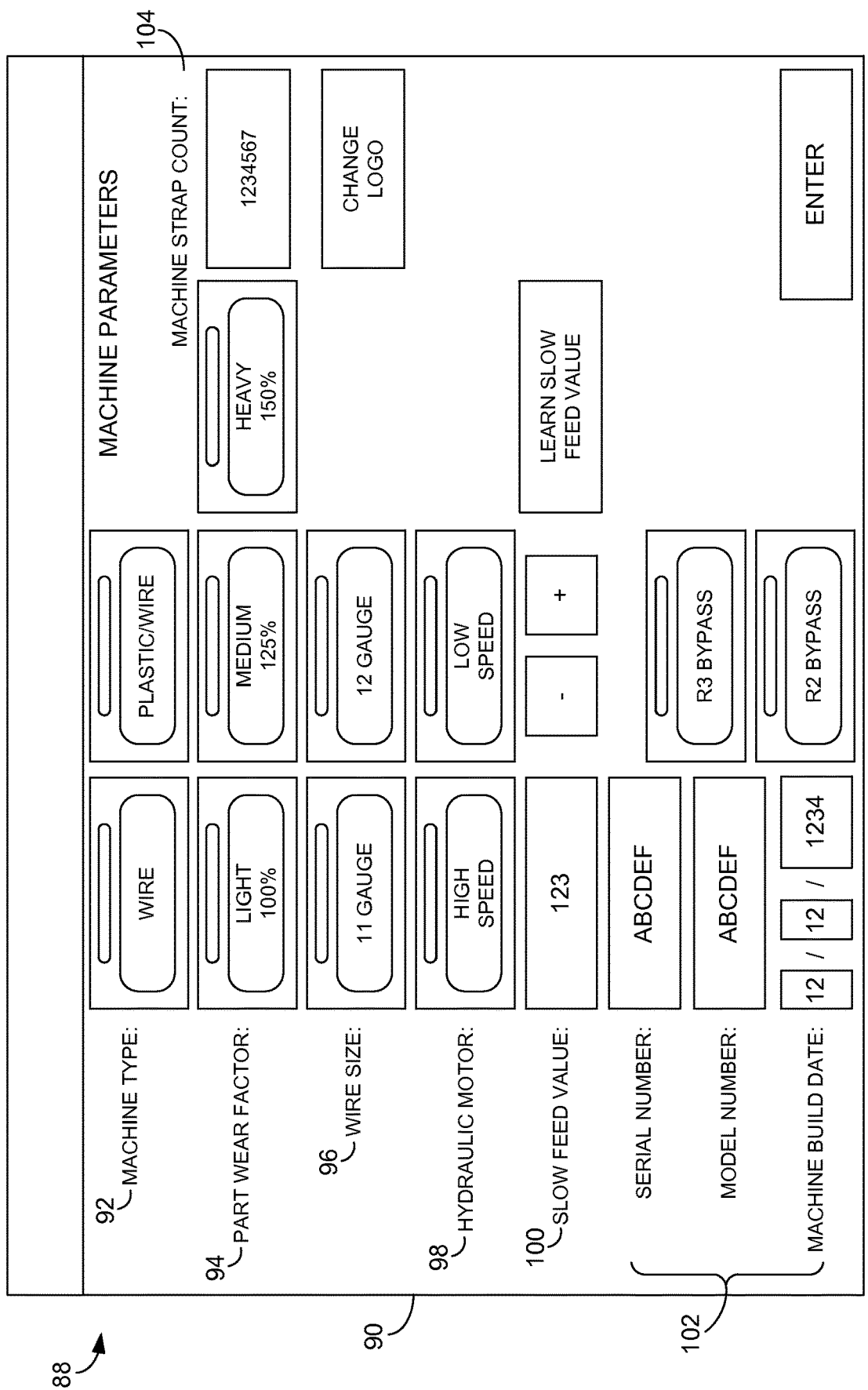
FIG. 6 is a display screen of an exemplary control user interface presenting machine parameters for a wire or plastic tying system, in accordance with an embodiment of the present invention.

Turning now to FIG. 6, a display screen of an exemplary control UI 88 presenting machine parameters display 90 for a wire or plastic tying system is provided in accordance with an embodiment of the present invention. In one aspect of the invention, one or more features on the machine parameters display 90 may correspond to one or more activated features of a wire tying and/or plastic/wire tying system, as provided by the tying system manufacturer. Accordingly, in some embodiments, one or more of the machine parameters display 90 features may be configured to remain inactive during use by a control UI operator, but may enable one or more selection options during manipulation by a manufacturer technician and/or other manufacturer authorized entity. As shown in the example of FIG. 6, in some embodiments, the machine parameters 90 may include machine type content 92, part wear factor content 94, wire size content 96, hydraulic motor content 98, slow feed value content 100, machine identification content 102, and/or strap count content 104. As discussed above, one or more features displayed on the machine parameters display 90 may be accessed remotely from a controller (e.g., supervisor or maintenance technician) retrieving data regarding the particular wire tying system coupled to the particular control system UI.

Figure 7:
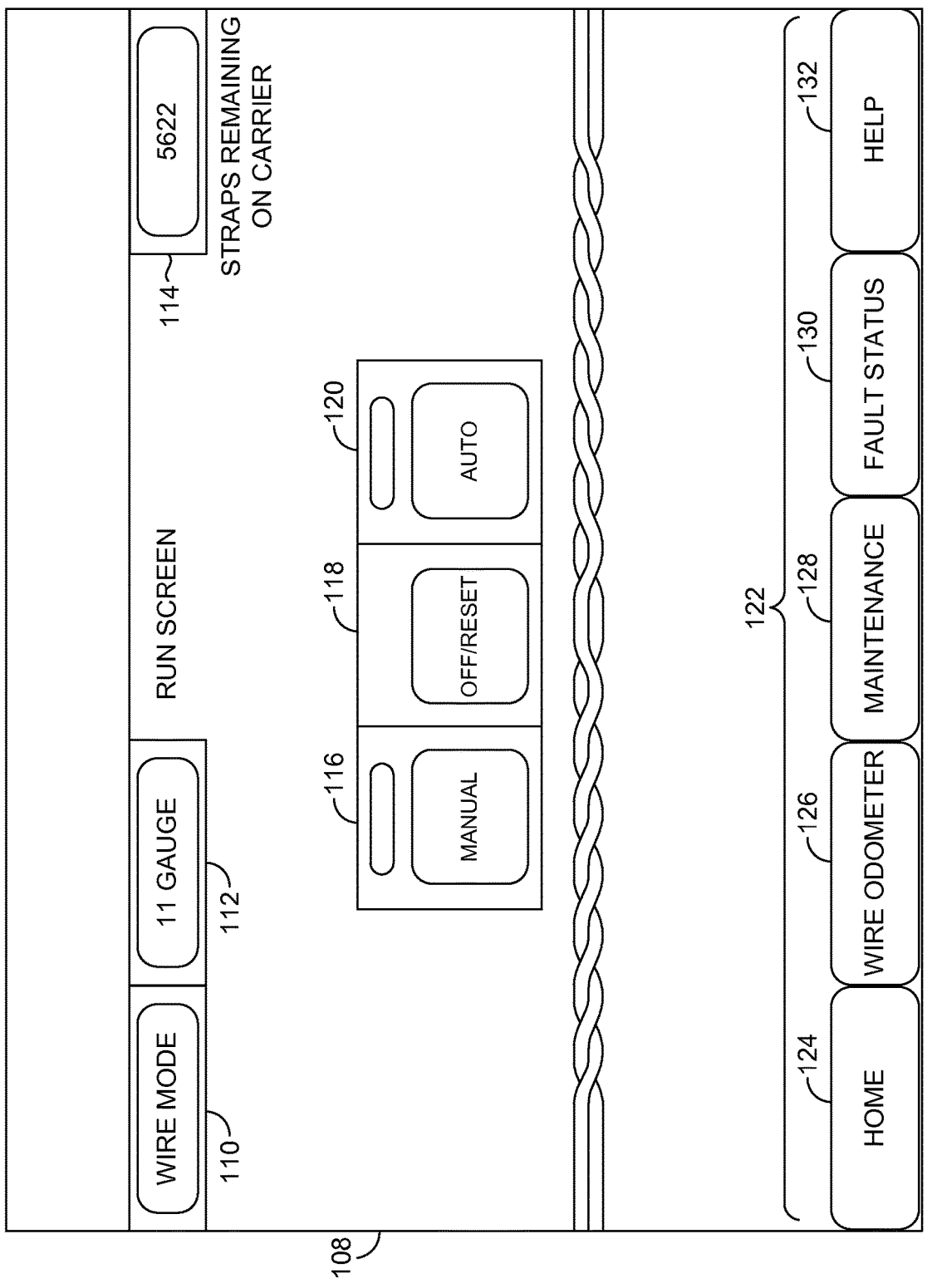
FIG. 7 is a display screen of an exemplary control user interface including a run screen for a wire tying system, in accordance with an embodiment of the present invention.

With reference now to FIG. 7, a display screen of an exemplary control UI 106 including a run screen 108 for a wire tying system is provided in accordance with an embodiment of the present invention. In one embodiment of the invention, a run screen 108 is presented in response to selection of an enter command 54, such as the selection indicator of enter command 54 in FIG. 4. In some embodiments, the exemplary run screen 108 of FIG. 7 includes one or more items of content relevant to operation of the tying system in a wire-tying mode, as indicated by wire mode indicator 110, which may also identify the current wire gauge 112. In some aspects, the mode indicator 110 provides an indication of the mode selection received via the control UI of FIG. 3 and/or FIG. 4. In some aspects, a mode indicator may include an indication of either a wire mode selection or a plastic mode selection.

In further embodiments, exemplary run screen 108 may include a manual mode selection indicator 116, an off/reset selection indicator 118, an auto mode selection indicator 120, a strap-remaining indicator 114 and a plurality of control features 122 associated with the control system for the wire tying device. In one embodiment, the plurality of control features 122 includes a home selection indicator 124, a wire odometer selection indicator 126, a maintenance selection indicator 128, a fault-status selection indicator 130, and/or a help selection indicator 132. As will be understood, the plurality of control features 122 on the exemplary run screen 108 may include additional and/or alternative control features for various aspects of the wire tying system, in addition or in alternative to those depicted in FIG. 7.

In one aspect of the invention, user selection of the home selection indicator 124 (e.g., a user contacting the touchscreen of the UI 106 at or around the home selection indicator 124), returns a user of a control UI to the initial home display screen, such as the startup display 52 of the control UI 50 in FIG. 3 and/or the startup display 68 of the control UI 66 in FIG. 4. In some aspects, the wire odometer selection indicator 126 may be used to navigate to the wire odometer UI 183 discussed below with reference to FIG. 12. In further embodiments, the maintenance selection indicator 128 may be used to navigate to a maintenance monitoring UI (such as the maintenance monitoring displays 208 and 276 of FIGS. 13 and 15, respectively), while the fault-status selection indicator 130 may be used to navigate to the fault screen display 356 of the control UI 354 in FIG. 18. Additionally, as shown in the example of FIG. 19, a user may select the help selection indicator 132 to navigate to the troubleshooting display 378 of FIG. 19.

Figure 8:
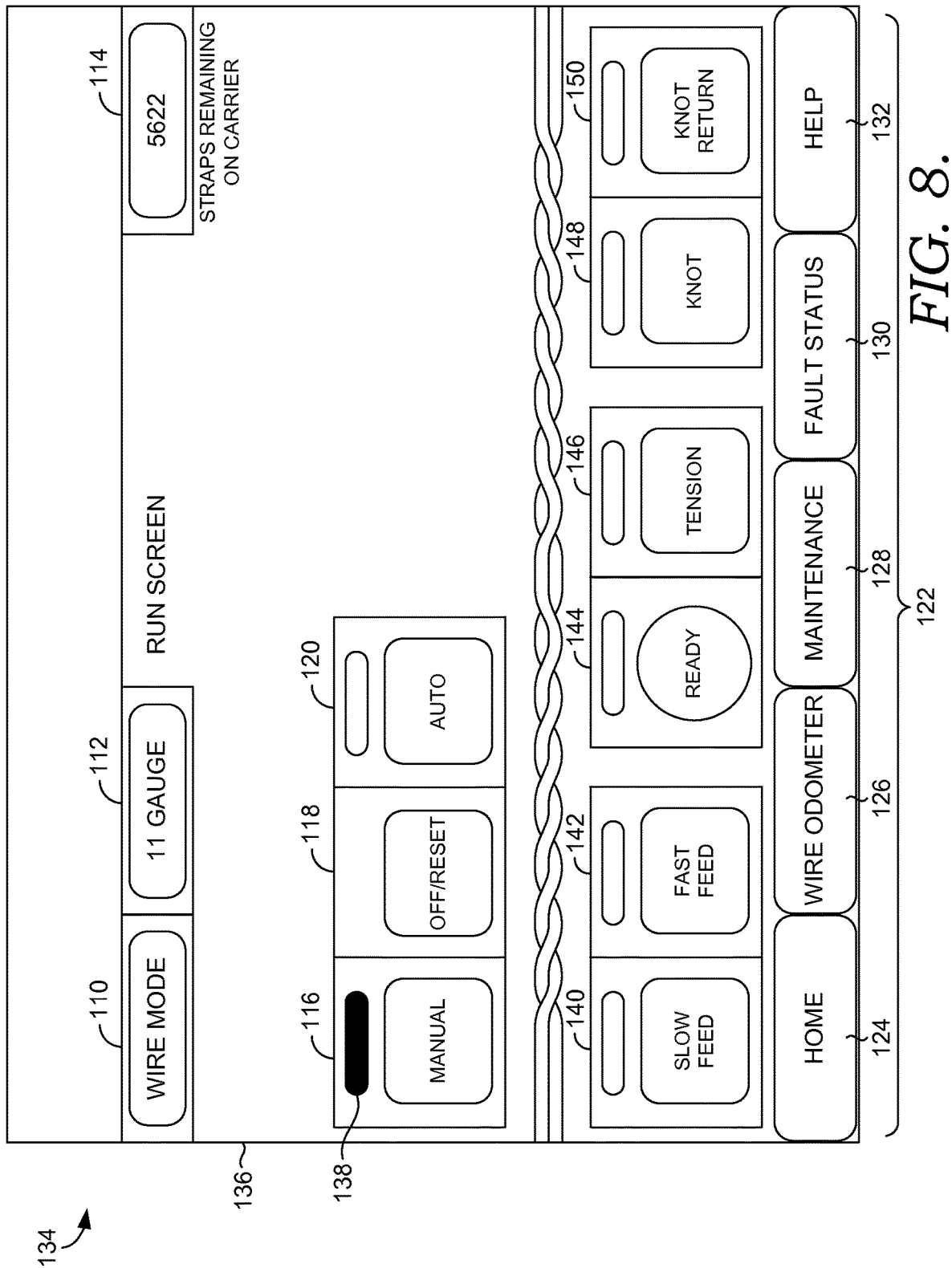
FIG. 8 is a display screen of an exemplary control user interface including a run screen for a wire tying system, in accordance with an embodiment of the present invention.

As depicted in the exemplary run screen 136 of the control UI 134 in FIG. 8, upon selection of the manual mode selection indicator 116, one or more additional control features may be presented to a user. In one example, based on an indication of selection of a manual wire tying mode, as indicated in FIG. 8 by manual selection indicator 138, multiple control features are presented on the touchscreen display of run screen 136. In the example of FIG. 8, the control features presented in response to manual mode selection include a slow feed control 140, a fast feed control 142, a ready indicator 144, a tension control 146, a knot control 148, and a knot return control 150.

In some aspects of the invention, the manual controls for operation of the wire tying system presented on run screen 136 correspond to the sequential operation of the wire tying system. For example, in one embodiment, the slow feed control 140 controls an initial slower feeding of a wire into a track of a bulk material baling machine (i.e., the track of the wire tying system), while the fast feed control 142 controls the subsequent feeding that is comparatively faster than the slower feeding into the same track. Once the wire is fully fed into the track, in some embodiments, the ready indicator 144 illuminates to indicate that the system is ready for tying (i.e., that the wire end has reached "wire home" around the track). In embodiments, if no wire is present (i.e., no wire is present in the "wire home" position for knotting), then the ready indicator 144 will not be illuminated. If the controls receives an indication that the wire is correctly loaded into the track (i.e., in wire home), then the run screen features will be configured to begin tensioning, and to complete the cycle/knotting process. The wire may then be tensioned, in some embodiments, using the tension control 146. Having tensioned the wire, the wire may be knotted via knot control 148 and the knot may be returned/released via the knot return control 150, according to some embodiments of manual mode operation of the wire tying system via the run screen 136.

In some embodiments, a manual mode selection via manual mode selection indicator 116 corresponds to a maintenance user logging in to access the control UI. Accordingly, with respect to safety precautions while performing maintenance on a wire-tying system, a user logged in to manual mode for maintenance purposes may require a slow feed feature (via slow feed control 140) followed by a fast feed feature (via fast feed control 142).

Figure 9:
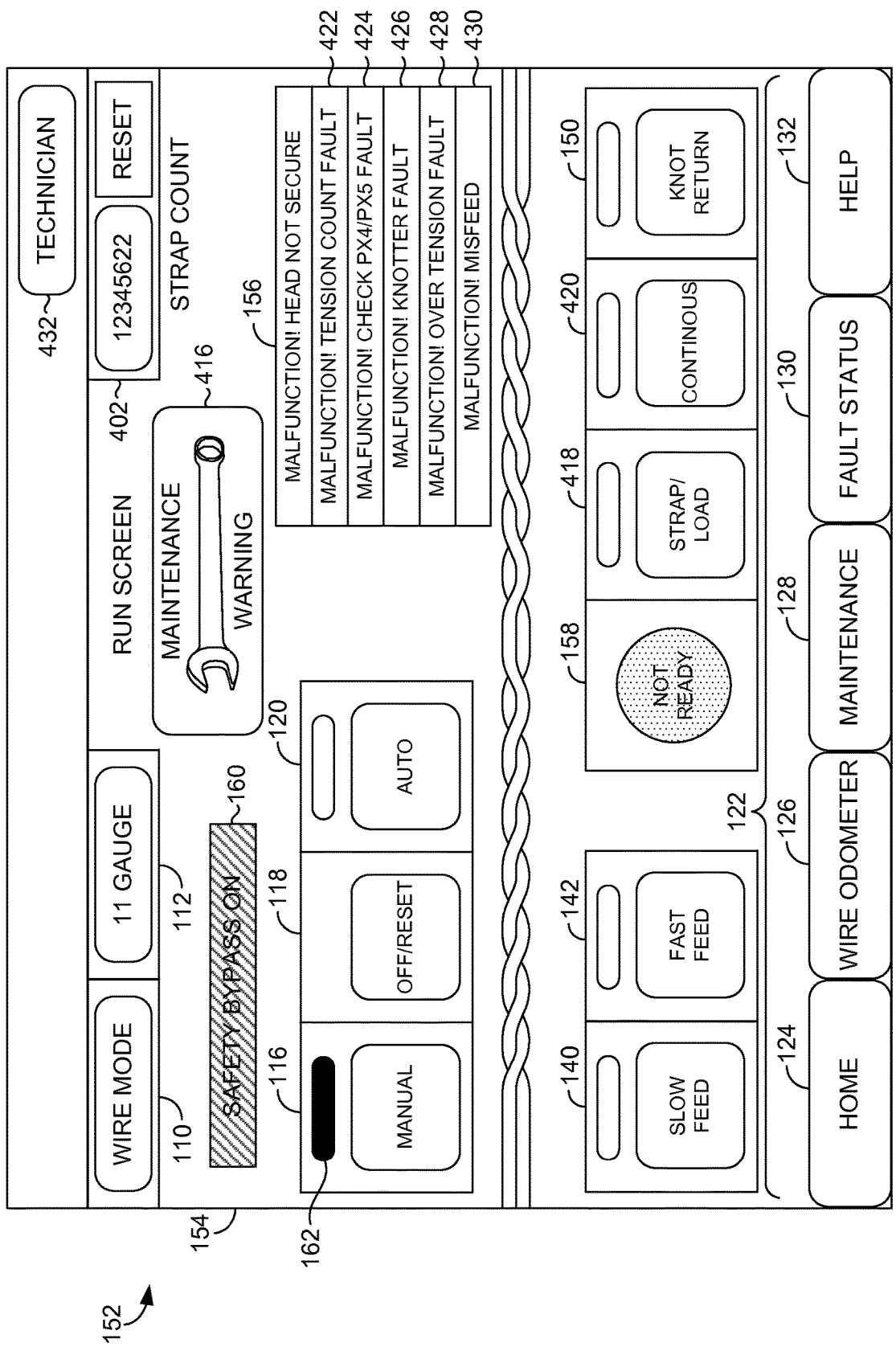
FIG. 9 is a display screen of an exemplary control user interface including a run screen for a wire tying system, in accordance with an embodiment of the present invention.

During operation of the wire tying system, via touchscreen controls from the control UI of the present invention, an error message may be received by the system. As such, as shown in FIG. 9, a display screen of an exemplary control UI 152 including a run screen 154 for a wire tying system is presented in accordance with an embodiment of the present invention. In the example of FIG. 9, the runs screen 154 may further include a safety bypass indicator 160, a maintenance warning indicator 416, first, second, third, fourth, fifth and sixth malfunction indicators 156, 422, 424, 426, 428, and 430, and/or a technician indicator 432. Additionally, in response to a maintenance warning being determined by the control system and/or displayed by the control UI, the not ready indicator 158 may become illuminated. In further embodiments, while a technician is logged into the system in response to a maintenance error, such as a technician logging into the control system via the startup display 76 of FIG. 5A, a technician indicator 432 may be included in the run screen 154, while multiple warning indicators may be activated for viewing and/or troubleshooting. In some aspects, based on a technician logging into the control UI 152, the strap count indicator 402 may be presented to the technician, for assisting with troubleshooting.

Figure 10:
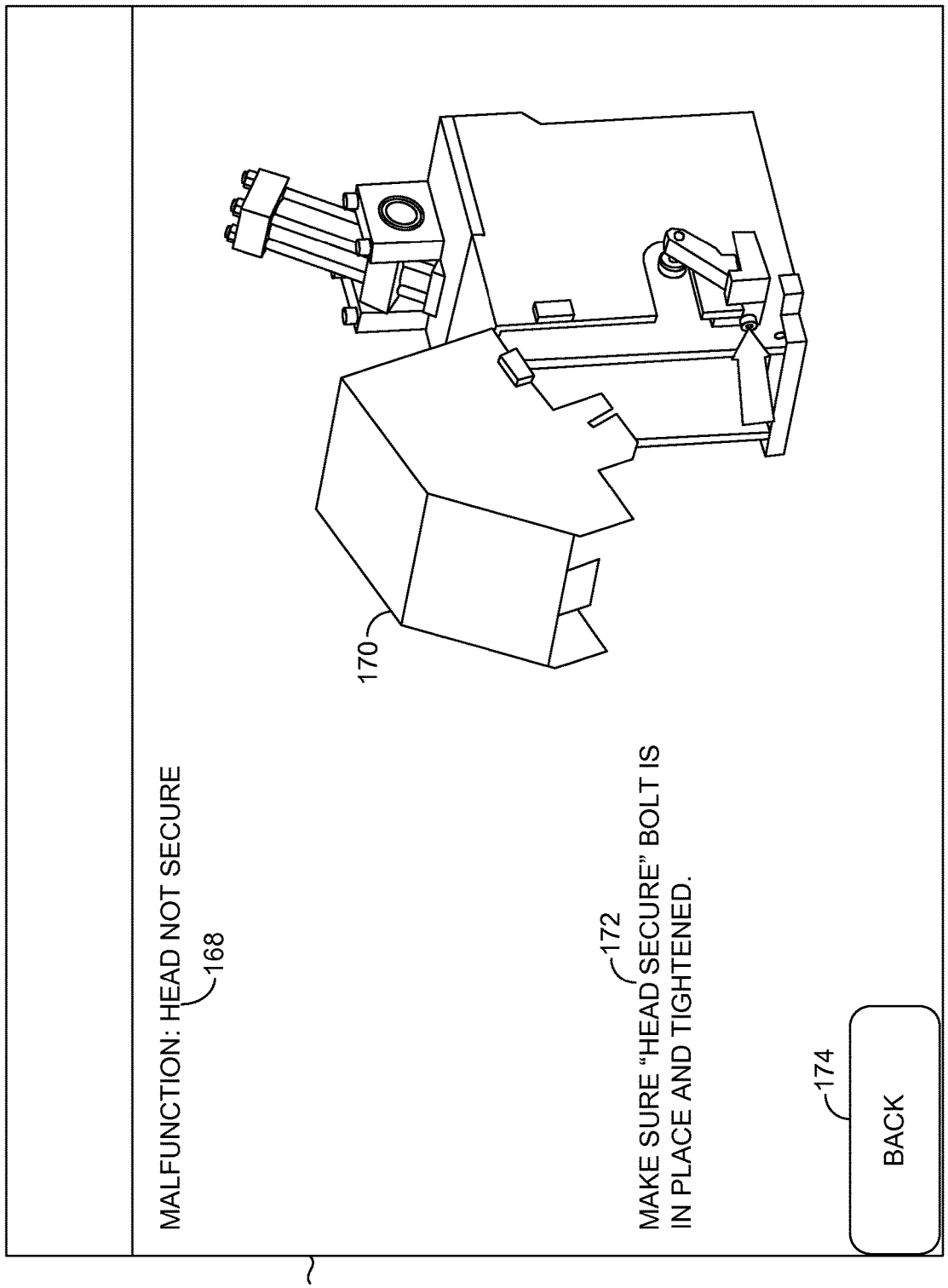
FIG. 10 is a display screen of an exemplary control user interface including a malfunction display, in accordance with an embodiment of the present invention.

As shown in FIG. 9, one or more of the maintenance warning indicators are presented in the context of the manual mode run screen 154 to provide an indication to a user at a time of operation of an instance and/or identity of a malfunction related to the control system and/or wire tying system. In one example, a user may select the malfunction indicator 156, in response to which the run screen 154 may display a particular part and/or location of the malfunction, such as the malfunction display 166 of the control system UI 164 of FIG. 10. In one aspect of the invention, the malfunction display 166 includes a textual indicator of a malfunction 168, a graphical indicator of a malfunction 170, a set of one or more instructions 172 corresponding to the particular malfunction, and a return selection indicator 174 for exiting the malfunction display 166 (and returning to the run screen 154 of control system UI 152).

Figure 11:
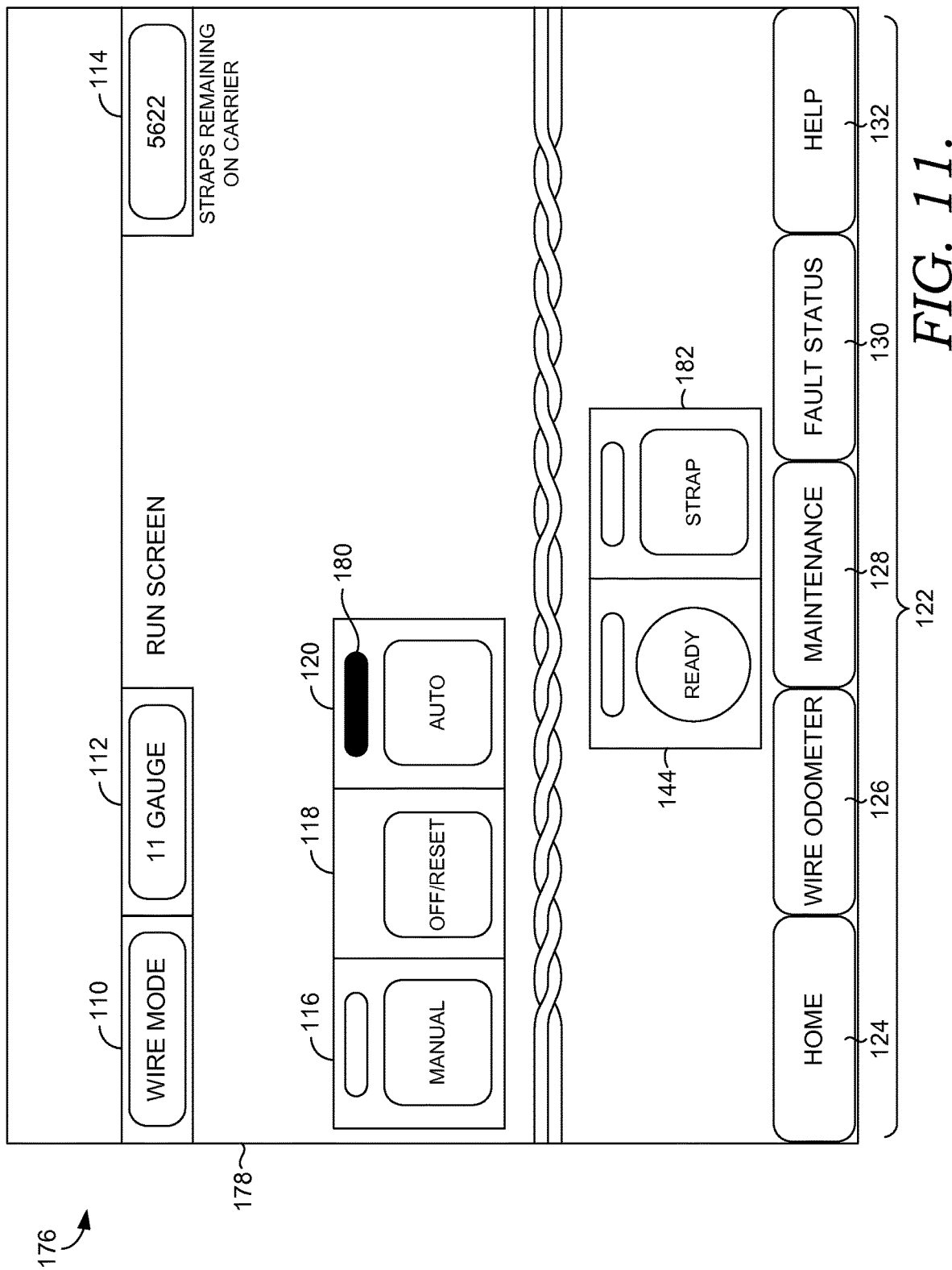
FIG. 11 is a display screen of an exemplary control user interface including a run screen for a wire tying system, in accordance with an embodiment of the present invention.

Turning now to the example of FIG. 11, a display screen of an exemplary control UI 176 including a run screen 178 for a wire tying system is provided in accordance with an embodiment of the present invention. In the example of FIG. 11, the auto mode selection indicator 120 is selected, as indicated by selection indicator 180. In one embodiment, in response to selection of the auto mode for strapping using the wire tying system coupled to the control UI 176, various features corresponding to the automatic operation of the control system are populated on UI 176. For example, the run screen 178 of FIG. 11 includes a ready indicator 144 and a strap control 182. In the embodiment of FIG. 11, a user may proceed to automatically strap a baled material using wire tying system, once the light of the ready indicator 144 is illuminated. In some aspects, the selection of strap control 182 automatically controls and/or initiates the wire-tying system activation of each of the steps associated with the slow feed control 140, fast feed control 142, ready indicator 144, tension control 146, knot control 148, and knot return control 150.

In further aspects of the invention, with a user and/or operator of the run screen 178 logged into the control system, the number of straps remaining on the wire carrier are indicated at strap remaining indicator 114. As such, in various embodiments of the invention, a user operating a wire tying system via the run screen 178 may simultaneously view the number of straps remaining on a current wire carrier via strap remaining indicator 114, while preparing to depress the strap control 182 during automatic wire strapping. In one embodiment, a user may view additional maintenance, fault, troubleshooting and/or other messages via the run screen 178 in context of the strap remaining indicator 114 and the strap control 182. In further embodiments, the strap control 182 may be activated or inactivated based on one or more indications presented on the run screen 178, such as an insufficient remaining strap number indicated in strap remaining indicator 114, or a malfunction error displayed as part of the run screen 178.

Figure 12:
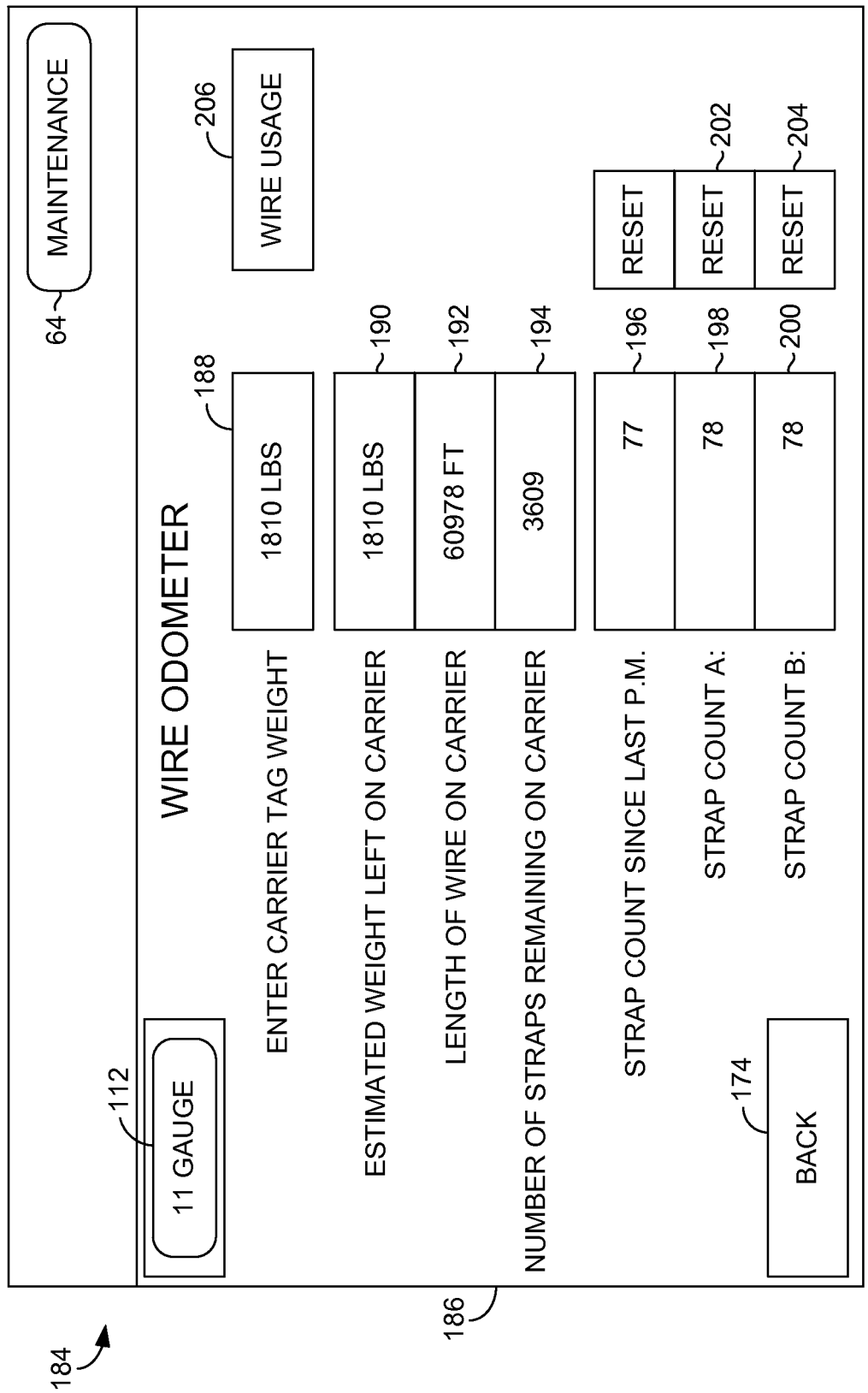
FIG. 12 is a display screen of an exemplary control user interface including a wire odometer display, in accordance with an embodiment of the present invention.

Referring next to FIG. 12, a display screen of an exemplary control UI 184 including a wire odometer display 186 is provided in accordance with an embodiment of the present invention. As shown in FIG. 12, the wire odometer display 186 may include a current wire gauge 112 indicator, a carrier tag weight indicator 188, an estimated carrier weight indicator 190, a length of carrier wire indicator 192, a strap remaining on carrier indicator 194, a strap count since last preventative maintenance (P.M.) indicator 196, a strap count A indicator 198, a strap count B indicator 200, one or more reset indicators 202 and 204, a wire usage indicator 206, a maintenance indicator 64, and a return selection indicator 174. As will be understood, one or more of the features included on the wire odometer display 186 in the example of FIG. 12 may be changed, replaced, and/or removed without departing from the scope of the invention. In one embodiment, the maintenance indicator 64, when illuminated and/or active, indicates to a user that one or more features of the wire odometer display may be activated that would otherwise be inactive for a system operator without maintenance access.

In embodiments, the wire odometer display 186 is used to monitor an amount of a remaining consumable material, such as an amount of wire and/or plastic used for tying by a bulk material baling system. In one embodiment of the wire odometer display 186, a method of monitoring and/or displaying the estimated number of straps remaining on a wire carrier (i.e., the number of straps that may be tied using the current wire carrier coupled to a wire strapping device, controlled by the control system and/or control UI of the present invention) is based on a determination using, at least, the user-entered carrier tag weight via carrier tag weight indicator 188, the current wire gauge 112 (and corresponding number of feet per pound of the particular gauge of material), the bale perimeter length of the bulk material being tied, and a monitored measurement of the amount of wire consumed by the system during tying.

In one embodiment, a user manually enters weight information into the carrier tag weight indicator 188. This entered weight may then be used in conjunction with the wire gauge and corresponding weight per foot of the wire gauge to determine an initial number of feet on the wire carrier. With the known number of initial feet of wire, with each strap tied from the wire carrier, a length of remaining wire is reduced based on the amount of wire consumed, as shown in the length of carrier wire indicator 192. In some aspects, the calculated remaining length of wire is divided by an estimated length of wire needed to tie a strap using the wire tying system (e.g., an average length of wire used to tie a single wire strap on a baled material). As such, the determined number of straps remaining on the carrier is provided via the strap remaining on carrier indicator 194. In some aspects, the number calculated via the wire odometer display 186 is then populated on one or more different interfaces of the control system, such as the number of straps remaining indicator 114 of FIG. 7. In other words, a user may monitor the number of remaining straps available during operation of the wire tying system by viewing the number of straps remaining 114 in context of a run screen, such as the run screen 108 of FIG. 7. In some embodiments, the wire odometer determination of a number of straps remaining on a current wire carrier may be communicated to a remote device, such as a maintenance technician and/or supervisor retrieving data from the control UI, to coordinate the subsequent replacement of a wire carrier during operation.

In further embodiments, a wire odometer of the control system and/or control UI includes a computing device coupled to the wire-tying system that determine the calculated length of wire on the carrier for display in the length of carrier wire indicator 192. Similarly, one or more components of a computing device of the control system may be configured to determine the number of straps remaining on a carrier 194 for presentation to a user.

In one embodiment, a control UI and/or control system coupled to a wire-tying system determines the number of straps remaining for a particular wire carrier based on both the determination of the amount of remaining wire on the carrier (e.g., carrier wire indicator 192) and the strap length for the wire-tying system. In some embodiments, the strap length is based on the addition of the bale perimeter length and an overlap amount (i.e., the extra amount of wire used for knotting/tying the strap). As such, in some embodiments, the estimated number of straps remaining on a wire carrier accurately represents, using the real-time wire odometer features of control UI 184 data, how many bales of material can be tied before a replacement carrier of wire is needed.

In some aspects of the invention, a carrier weight is entered and the known gauge for which the wire-tying system is currently configured is used to determine the length of wire on the carrier. For example, based on the entered carrier weight and the known gauge, a linear footage of the wire is determined. Further, with the number of inches per cycle required by the wire-tying system, a determination of the number of remaining straps on the carrier is made. In one aspect, the number of straps remaining depends on the inches per cycle that the wire-tying system has been using per cycle, which may include the overall number of inches consumed by each cycle (i.e., the inches of wire fed into the wire-tying system minus the inches of wire removed from the system during tensioning).

In embodiments of the invention, a wire-tying system and/or bulk material baling device coupled to the control system and/or control UI may be configured to strap a variety of different types of materials, such as bales of household trash and bales of cardboard materials. In some aspects, each type of baled material has unique compression characteristics. In other words, a wire strap used to tie a bale of soft-compression household trash may have a different length than a wire strap used to tie a bale of hard-compression cardboard materials. As such, embodiments of the invention include a tracking component and/or monitoring mechanism for receiving an indication of an amount of wire that is going through the track of the wire-tying system coupled to the control UI. In some embodiments, to account for an actual size of an applied strap, the control system is configured to count the amount of wire that enters the track for each cycle, and subtract from that amount the number of inches of wire that came back out of the track during tensioning. In other words, the actual length of used wire may be tracked, according to embodiments of the invention, for tracking in real-time how much wire is left on a carrier. In some embodiments, while an initial determination of the length of wire on a carrier is determined using the carrier weight and the known gauge of wire, the real-time calculation of length of wire remaining on the carrier may be based on the subtraction of the actual wire used from the starting amount of carrier wire.

In one embodiment, as shown in FIG. 12, the wire odometer display 186 includes monitoring data, such as the strap count since last PM indicator 196, strap count A indicator 198, and strap count B indicator 78. As such, a maintenance monitor may view how many straps have been tied since a last preventative maintenance took place for a particular strapping device. In some embodiments, based on an indication received from strap count since last PM indicator 196, a user may determine that a next preventative maintenance is due. In embodiments, the maintenance monitor features are password-protected, such that the strap count may only be reset by an authorized user. Further, the wire odometer display 186 of the control UI 184 includes an indicator/tracker for individual users based on the number of straps tied by each user, using the strap count A indicator 198 and the strap count B indicator 200. In some embodiments, strap count A indicator 198 and strap count B indicator 200 are coupled to individual odometers monitoring the number of cycles and/or straps performed by a first user (A) and a second user (B) respectively. In one embodiment, the strap count A indicator 198 is used to display a number of straps tied by a first user, while the strap count B indicator 200 is used to display a number of straps tied by a second user. As such, the first user having a first shift can independently record a number of straps tied using a tying system, separate from the second user having a different shift. Additionally, both users may be authorized to reset the number of straps counted during either shift, via the reset indicators 202 and 204.

In one embodiment of the invention, the wire odometer display 186 may be used to monitor an amount of tying material remaining on a carrier. In one embodiment, the tying material may be either a wire or a plastic consumable material. As such, a baling system may interchangeably incorporate a wire or plastic "tie" process for binding a bulk material, which may be monitored by different features of the wire odometer. In one embodiment, as described above, the features of the wire odometer display 186 may be used to monitor the consumption of wire used to tie the baled bulk material, while in another embodiment, the wire odometer may be used to monitor the consumption of a plastic material used for tying. As such, various data items may be accessed by the control system and/or wire-tying system to determine the corresponding remaining material amount. For example, determinations by the wire odometer of FIG. 12 may be based at least in part on bale perimeter length, starting length of a carrier of plastic tying material (e.g., linear footage), starting weight of a carrier of wire tying material, current (real-time) weight of a wire carrier, wire gauge, number of straps completed by the tying system (i.e., strap count), length of wire consumed during strapping, an amount of overlap of the tying material during tying and/or knotting, length of plastic material consumed during strapping, and/or other data received, determined, and/or displayed by the wire/consumable odometer. Additionally, such data utilized by the wire/consumable odometer may be manually entered and/or automatically determined. For example, the carrier tag weigh may be entered by a user, while the length of wire on the carrier is determined via calculation by the control system.

Figure 13:
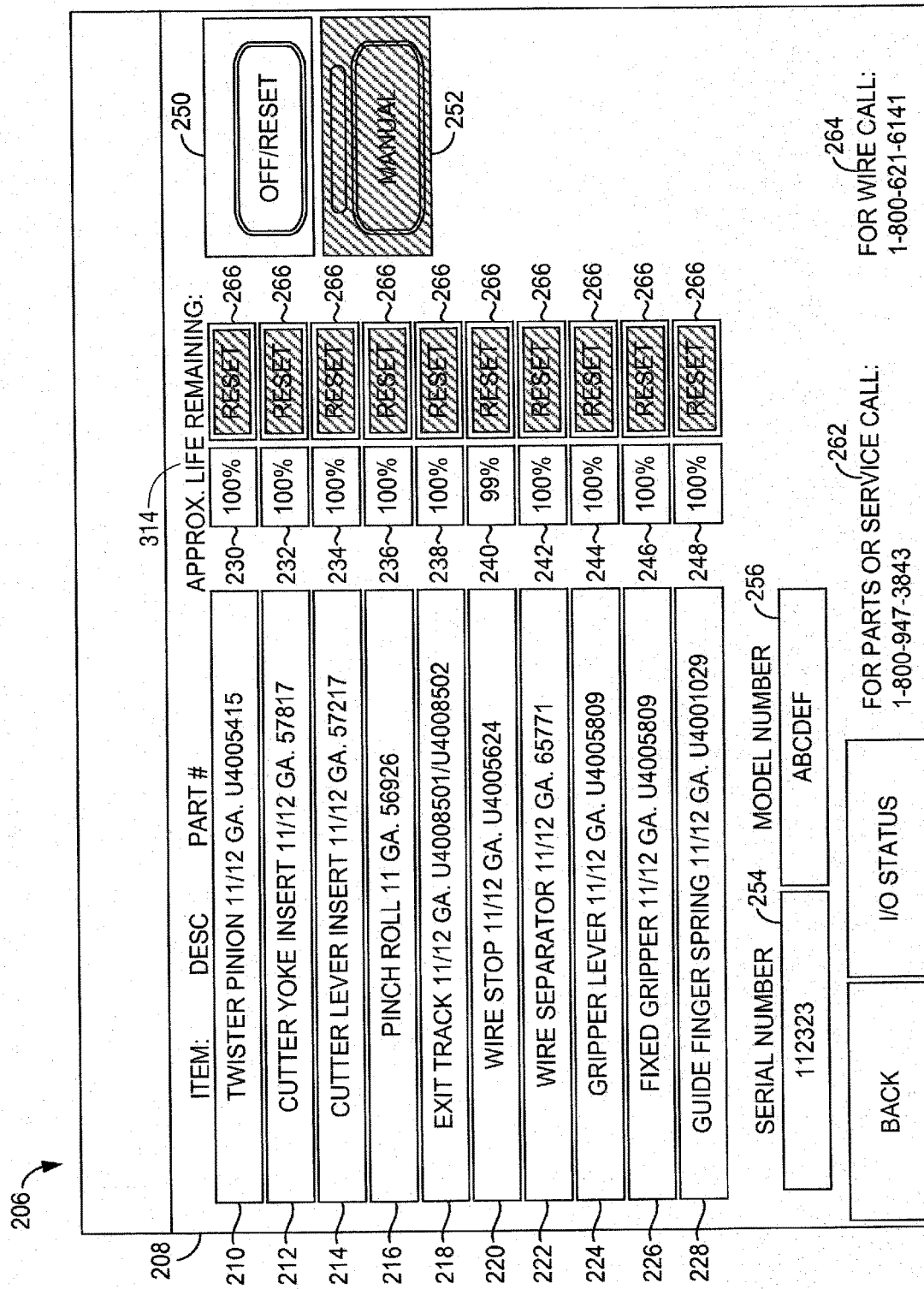
FIG. 13 is a display screen of an exemplary control user interface including a maintenance summary display, in accordance with an embodiment of the present invention.

Turning now to FIG. 13, a display screen of an exemplary control UI 206 including a maintenance summary display 208 is provided in accordance with an embodiment of the present invention. In the example of FIG. 13, the maintenance summary display 208 includes a twister pinion monitoring indicator 210, a cutter yoke insert 212, a cutter lever insert 214, a pinch roll indicator 216, an exit track indicator 218, a wire stop indicator 220, a wire separator indicator 222, a gripper lever indicator 224, a fixed gripper indicator 226, and a guide finger spring indicator 228. In some aspects, each of the indicators 210, 212, 214, 216, 218, 220, 222, 224, 226, and 228 correspond to an approximate remaining life indicator 230, 232, 234, 236, 238, 240, 242, 244, 246, and 248, respectively. In some embodiments, a particular part indicator may be associated with a particular number of cycles of expected total "life" for that particular part. As such, in one example, the control system and/or control UI may be configured to monitor the number of cycles strapped by the wire-tying system in light of a known number of cycles for a particular component, such as the twister pinion. In this example, the twister pinion component may have a particular expected number of cycles for its lifespan, such as 240,000 cycles. As such, the corresponding approximate life remaining indicator 230 associated with the twister pinion monitoring indicator 210 may display a 50% life remaining indication for the twister pinion once the system has cycled 120,000 times. In other words, each of the approximate life remaining percentages monitored and/or displayed by the control system are based on the corresponding component of the wire-tying system, and may be configured to reduce at different rates based on the initial life expectancy of the component and the number of cycles run by the system.

Figure 14:
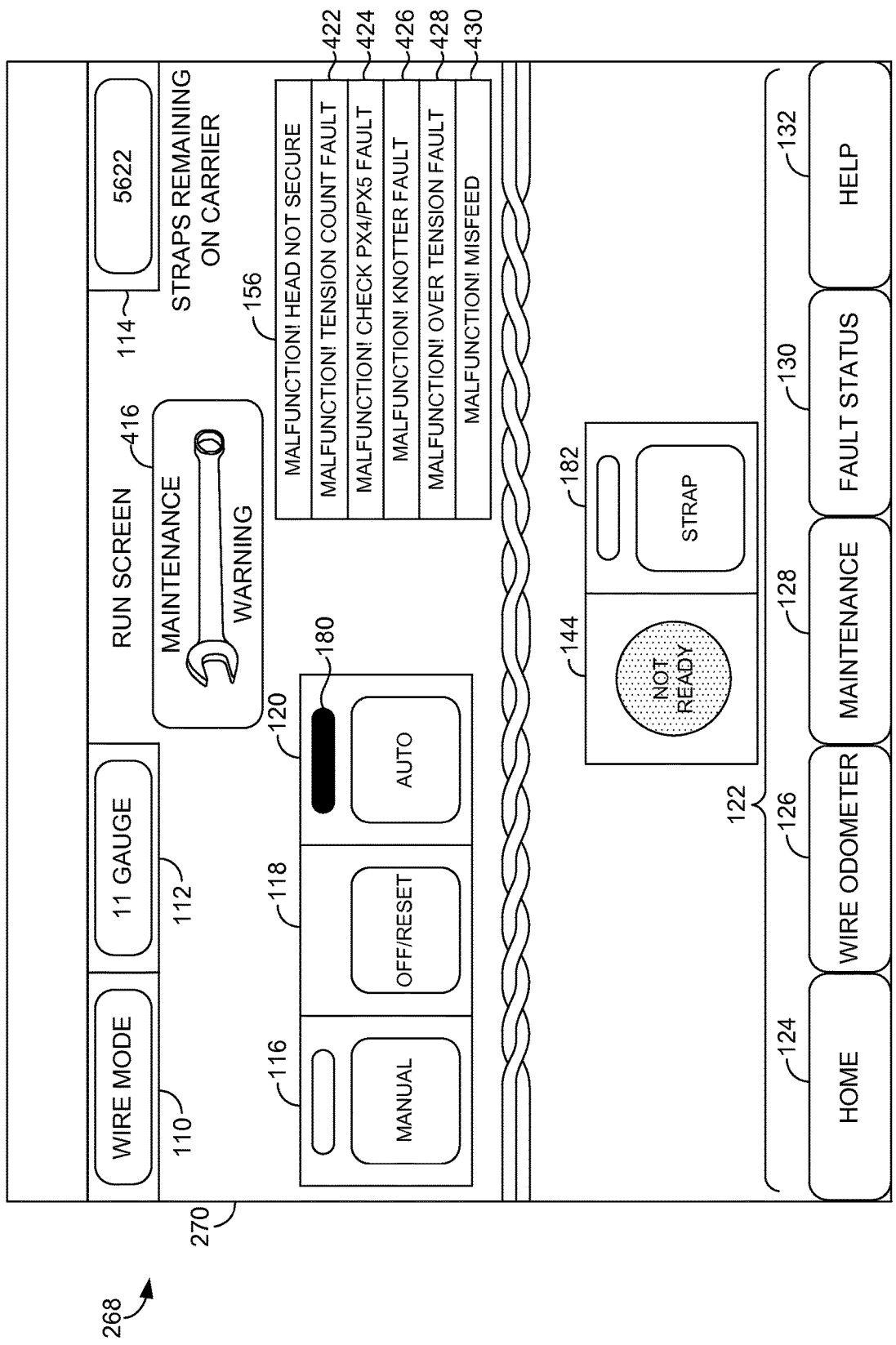
FIG. 14 is a display screen of an exemplary control user interface including a run screen for a wire tying system, in accordance with an embodiment of the present invention.

In some aspects of the invention, on one or more approximate life remaining indicators may begin to flash at a threshold level of life expectancy. For example, once an approximate life expectancy value 314 reaches 5%, the twister pinion monitoring indicator and/or approximate life remaining indicator 314 may begin to flash. In further aspects, in response to a triggered threshold level of approximate life remaining (i.e., 5% remaining), an indication may be provided to a run screen that notifies the user of the particular part needing to be replaced and/or reset, such as the maintenance warning 416 wrench provided on FIG. 14. In some embodiments, a maintenance warning is provided that, once selected, returns the user to a maintenance control UI, such as selection of the maintenance warning 416 returning the user from the run screen 270 of FIG. 14 to the maintenance summary display 208 of FIG. 13.

Additionally, each of the approximate remaining life indicators on the maintenance summary display 208 of FIG. 13 corresponds to a reset indicator 266, which in some embodiments, may only be reset by an authorized user, such as a maintenance technician. As further depicted in the maintenance summary display 208, the serial number 254 and model number 256 of the wire tying system may be indicated, along with a home return indicator 258, an input/output (I/O) indicator 260, service contact information 262, wire contact information 264, an off/reset action indicator 250, and a manual action indicator 252.

In one embodiment of the invention, the maintenance summary display 208 of control UI 206 may be presented in response to selection of one or more of the maintenance warning indicator 416, and the first, second, third, fourth, fifth and sixth malfunction indicators 156, 422, 424, 426, 428, and 430, such as the maintenance warning indicators and malfunction indicators presented in FIG. 9 during manual mode and/or FIG. 13 during automatic operation. In the example of FIG. 13, the plurality of parts monitoring indicators 210, 212, 214, 216, 218, 220, 222, 224, 226, and 228 includes item information, description information, and part number information. In further embodiments, the plurality of parts monitoring indicators includes additional and/or alternative information regarding each part. In one embodiment, each of the plurality of parts monitoring indicators 210, 212, 214, 216, 218, 220, 222, 224, 226, and 228 is associated with one or more items of content in a troubleshooting resource, such as a troubleshooting display of FIG. 20. In one aspect, each of the parts monitoring indicators is selectable, such that selection of a particular parts monitoring indicator directs a user to a particular troubleshooting display of the corresponding part, such as the display in FIG. 20.

In one embodiment, a wire-tying system (having a particular serial number 254 and model number 256) may be operating a plurality of parts, as exhibited by the plurality of parts monitoring indicators. One of the parts may be exhibiting a decreased "life expectancy" based on a comparison of 1) a calculated number of expected cycles for a particular part and 2) a number of cycles run by the wire tying system. As such, for each monitored part of the wire tying system, the controls system provides an indication of the approximate life remaining for each part, which may be reset by a maintenance/technician once the part is replaced and the life expectancy is restored. In further embodiments, the calculation of a life expectancy for an individual component of the wire-tying system may be determined based on additional and/or alternative user-input and/or auto-detected factors. As such, a warning and/or notification may be provided to a user, through one or more control UIs of the control system, which identifies that a particular part is expected to soon exceed its usable life based on the calculated life expectancy displayed on the control UI 206. In embodiments, having received an indication that one or more parts are approaching a threshold life expectancy (e.g., a 5% approximate life remaining for a particular part, based on the part's estimated number of expected cycles and the number of cycles run by the system), or that one or more high-wear parts are worn and/or having problems, a user may contact a manufacturer of the tying system using contact information 262, provide the tying system's serial number (254) and model number (256) so that the manufacturer can provide the appropriate troubleshooting assistance for the particular worn part.

In further embodiments, a warning and/or notification may be provided to a user through one or more control UIs of the control system identifying data determined as part of the present invention. For example, a maintenance warning 416 may be provided as part of the control UI 268 of FIG. 270, based on the number of cycles run by the system and a corresponding diminished life expectancy of one or more parts. In another example, a warning may be provided as part of the FIG. 14 display screen of an exemplary control UI 268 including a run screen 270 for a wire tying system in automatic mode. In other words, the not ready indicator 144 may alert a user that the number of straps remaining on the carrier (via indicator 114) is insufficient to complete a threshold number of subsequent straps. For example, a control system may be configured to alert a user when a minimum number of straps remain, such that the user has sufficient time to retrieve and replace the wire carrier during the operation of the device. In another embodiment, a warning may be generated regarding a number of straps remaining (as indicated via strap-remaining indicator 114) reaching a threshold number of straps for a particular carrier. In a further embodiment, a warning and/or notification may be provided to a user through one or more user interfaces regarding a determination of the wire odometer display 186, such as a notice displayed as part of the control UI 184 of FIG. 12 that indicates the approximate length of wire remaining on the carrier (i.e., the determination of carrier length indicator 192) is insufficient for tying a threshold number of straps. In a further embodiment, a warning and/or alert may be displayed as part of the run screen 108 of FIG. 7 when the estimated length of wire remaining on the carrier is approaching a threshold amount and/or the number of remaining straps triggers an alert to refill/replace the wire carrier.

Figure 15:
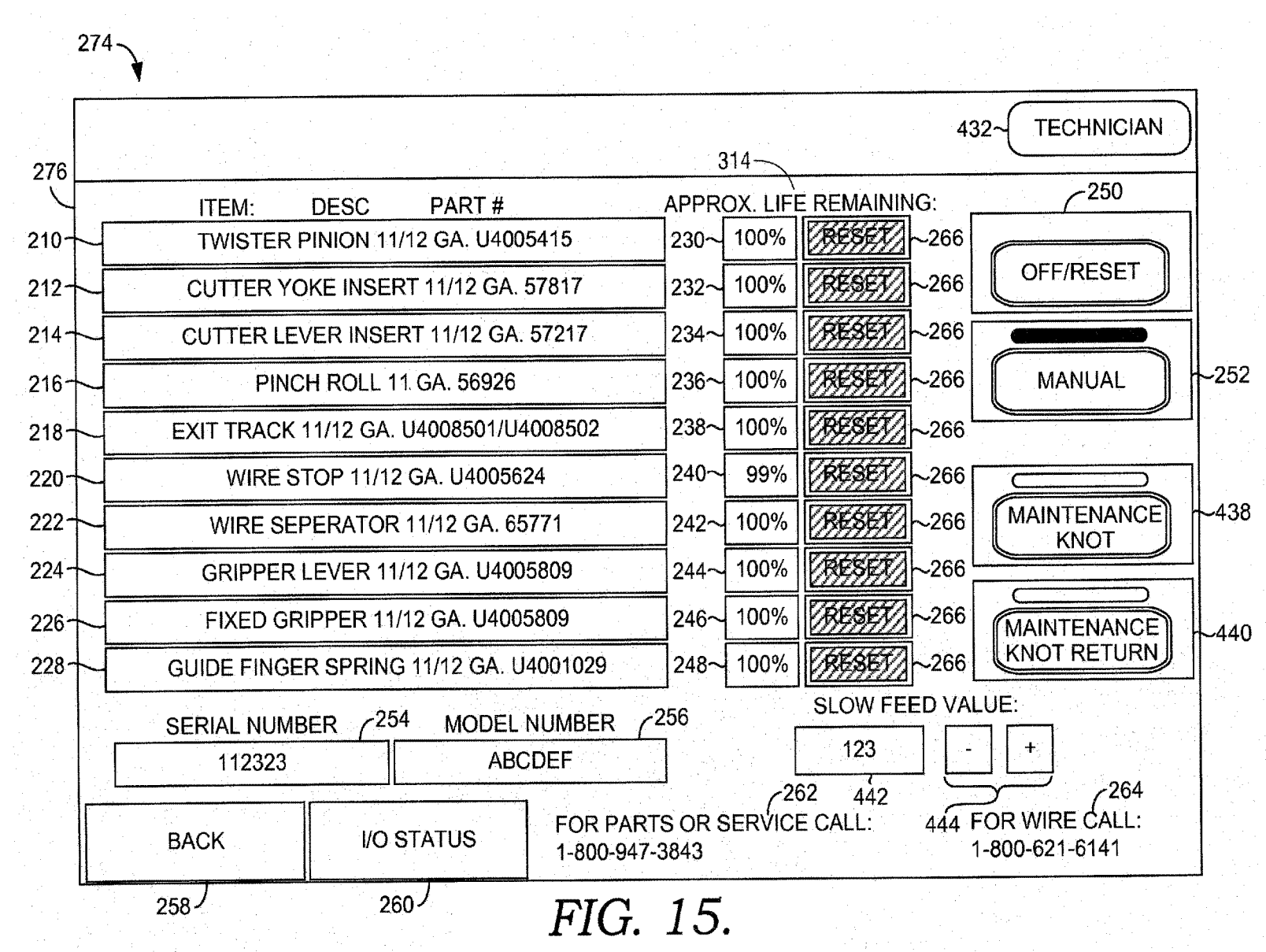

As shown in the example of FIG. 15, a display screen of an exemplary control UI 274 may include a maintenance monitoring display 276 that is accessed by a technician, as indicated by technician indicator 432. In one embodiment, the user accessing maintenance monitoring display 276 may access a manual mode 252 for manipulating one or more of the monitored components of the tying system. In embodiments, utilizing maintenance mode 252, the user may access a maintenance knot control 438, a maintenance knot return control 440, a slow feed value 442, and a slow feed adjuster 444. Upon selection of the I/O Status indicator 260, a display screen of an exemplary control UI 290 including an input/output status display 292 may be provided in accordance with an embodiment of the present invention, as shown in FIG. 16.

Figure 16:
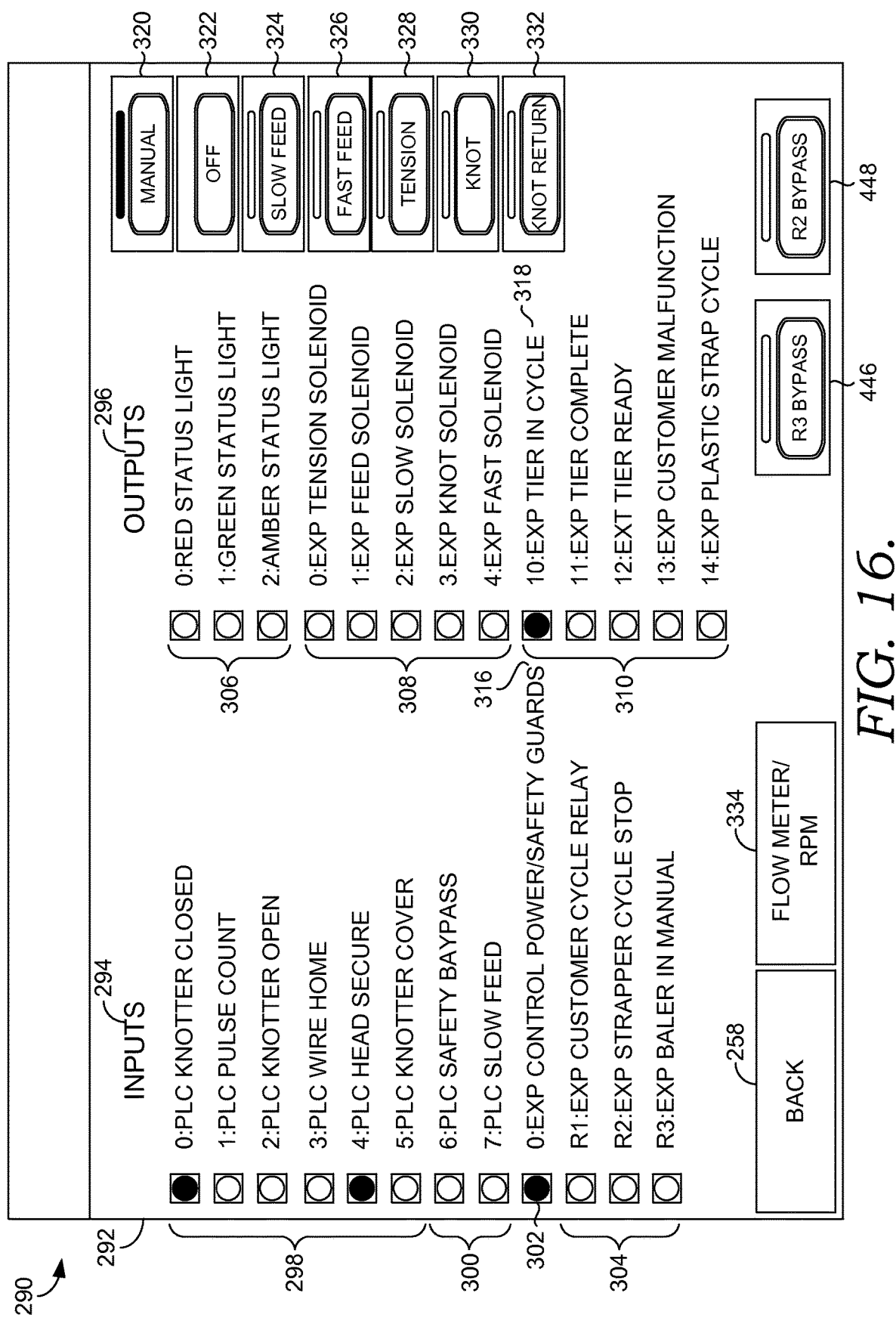
FIG. 16 is a display screen of an exemplary control user interface including an input/output status display, in accordance with an embodiment of the present invention.

In the example of FIG. 16, a series of inputs 294 and outputs 296 are presented to a user. In one embodiment, inputs 294 include tying head inputs 298, safety inputs 300, power input 302, and baler handshake indicators 304. In further embodiments, outputs 296 include status indicators 306, valve indicators 308, and status indicators 310. In one embodiment, at least one of the inputs 294 is highlighted, such as input 316 indicating that the particular input associated with power input 302 is being received by the control system. In another embodiment, at least one of the outputs is highlighted, such as the output 318 indicating that the particular output of one of the status indicators 310 is being output by the control system. In further embodiments, each of the outputs 296 may be forced by an operator, such as by touching one of the outputs 296 on the I/O display 292. As such, for a system component remaining inactive during operation, an operator may force the particular output from the control panel during troubleshooting to determine if the particular system component is able to produce the desired output. In further aspects, as shown in FIG. 16, the manual mode operation 320 may be engaged, providing a slow feed 324, fast feed 326, tension 328, knot 330, and knot return 332 controls to the user.

In some embodiments, the I/O display 292 may be used to verify the "handshake" (i.e., communication link between) the control UI/control system and the baling machine. In some embodiments, if a particular valve is not operating correctly, the I/O display 292 may be utilized to force an output to control the particular vale. As such, a user may then look to see if the valve has responded to the forced out put via the I/O display 292. Similarly, if a particular light is not coming on when expected, such as the green light status is not illuminating when the wire is in wire home position, a user may touch the green status light indicator on the outputs 296 portion of the control UI 290 to manually force an output. In this example, if the light does not illuminate when the output is depressed via the control UI 290, then a determination may be made that the green light bulb is burned out. If the green light does illuminate upon depressing the output, then a determination may be made that the wire home indicator output is not being communicated completely. In further examples, one or more of the solenoid valves may be forced to come on when activated via contacting of one or more of the valve indicators 308 on the I/O display 292 during troubleshooting via the control UI 290. As such, in some embodiments of the invention, one or more components of a wire tying system and/or baling machine may be coupled to one or more monitoring and/or detection features associated with the control system/control UI for association with one or more corresponding inputs/outputs presented on an I/O display 292. As such, one or more features of the control UI may be used to "test" one or more features of the tying system.

Figure 17:
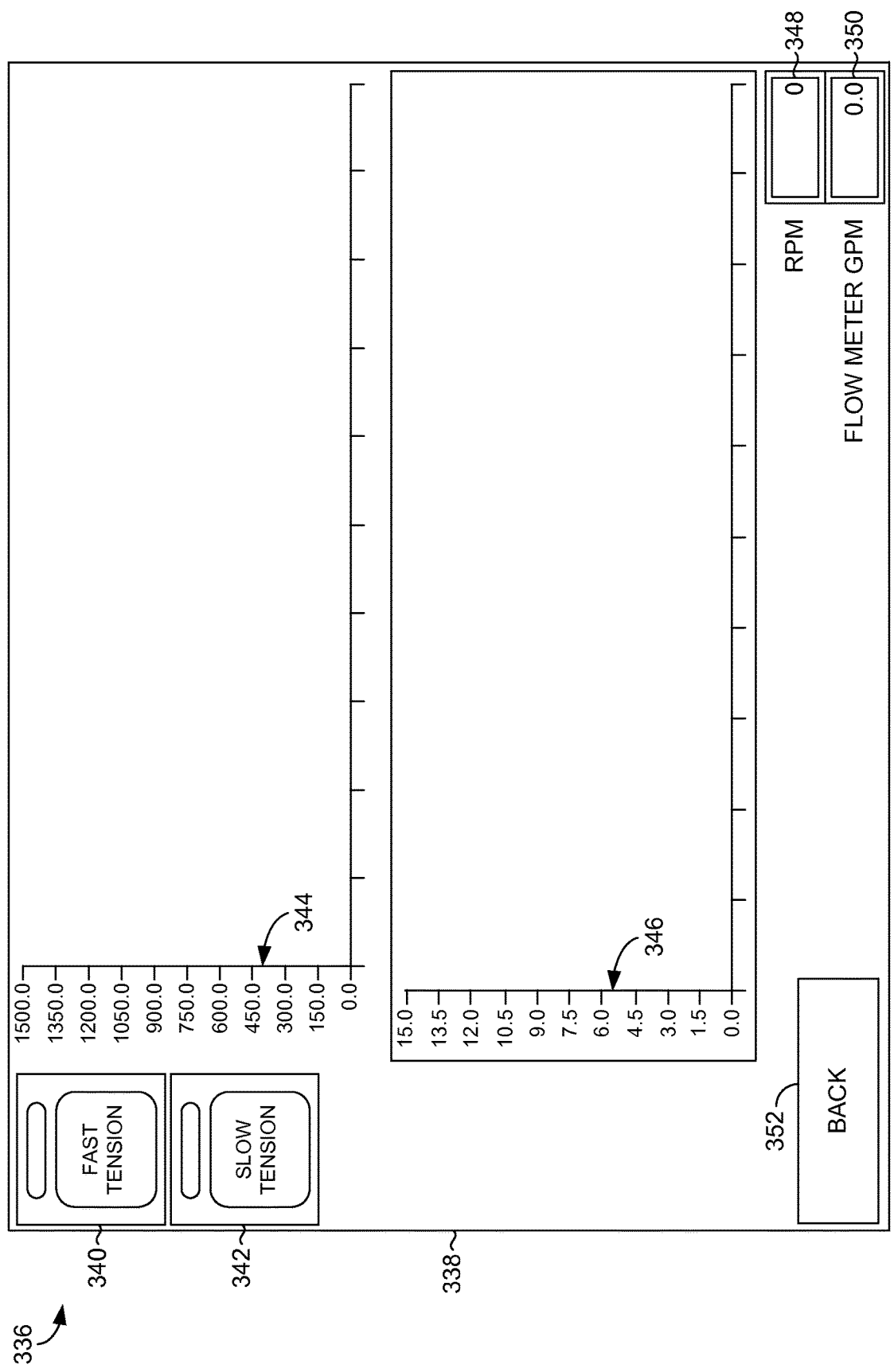
FIG. 17 is a display screen of an exemplary control user interface including a flow meter monitoring display, in accordance with an embodiment of the present invention.

In another embodiment, the I/O display 292 includes a flow meter/rpm indicator 334, an R3 Bypass control 446, and an R2 Bypass control 448. In one embodiment, upon selection of the flow meter/rpm indicator 334, a display screen of an exemplary control UI 336 including a flow meter monitoring display 338 is provided, as shown in the example of FIG. 17. The exemplary flow meter monitoring display 338 includes a fast tension control 340, a slow tension control 342, a rotation per minute (RPM) monitoring display 344, a flow meter gallon per minute (GPM) monitoring display 346, an RPM indicator 348, and a flow meter GPM 350. In some embodiments, during troubleshooting via the control system, a user may monitor a number of gallons per minute flowing to the tying system to determine whether an appropriate corresponding RPM is generated. In some embodiments, a wire-tying system requires a particular number of gallons per minute of hydraulic fluid to be supplied to it from the baler, while anything more or less than the particular amount will generate errors (e.g., the system cycling too fast or too slow). In some aspects, between 10-14 gallons per minute of hydraulic fluid are required by the system, while in further embodiments, 12 gallons per minute of hydraulic fluid are required. In some embodiments, a wire-tying machine controlled by the control UI 336 may be running incorrectly, and a user may check the flow meter monitoring display 338 to determine if the correct supply of hydraulic fluid is being supplied based on how fast the hydraulic motor should be spinning. In one example, with real-time monitoring, if the hydraulic motor is spinning at a corresponding correct RPM, the determination may be made that the correct number of gallons per minute of hydraulic fluid is being provided to the system. In some aspects, based on the speed of the motor (RPM), a user may access flow meter monitoring display 338 to determine the feed rate (i.e., flow meter GPM) that is being supplied to the wire-tying machine.

Figure 18:
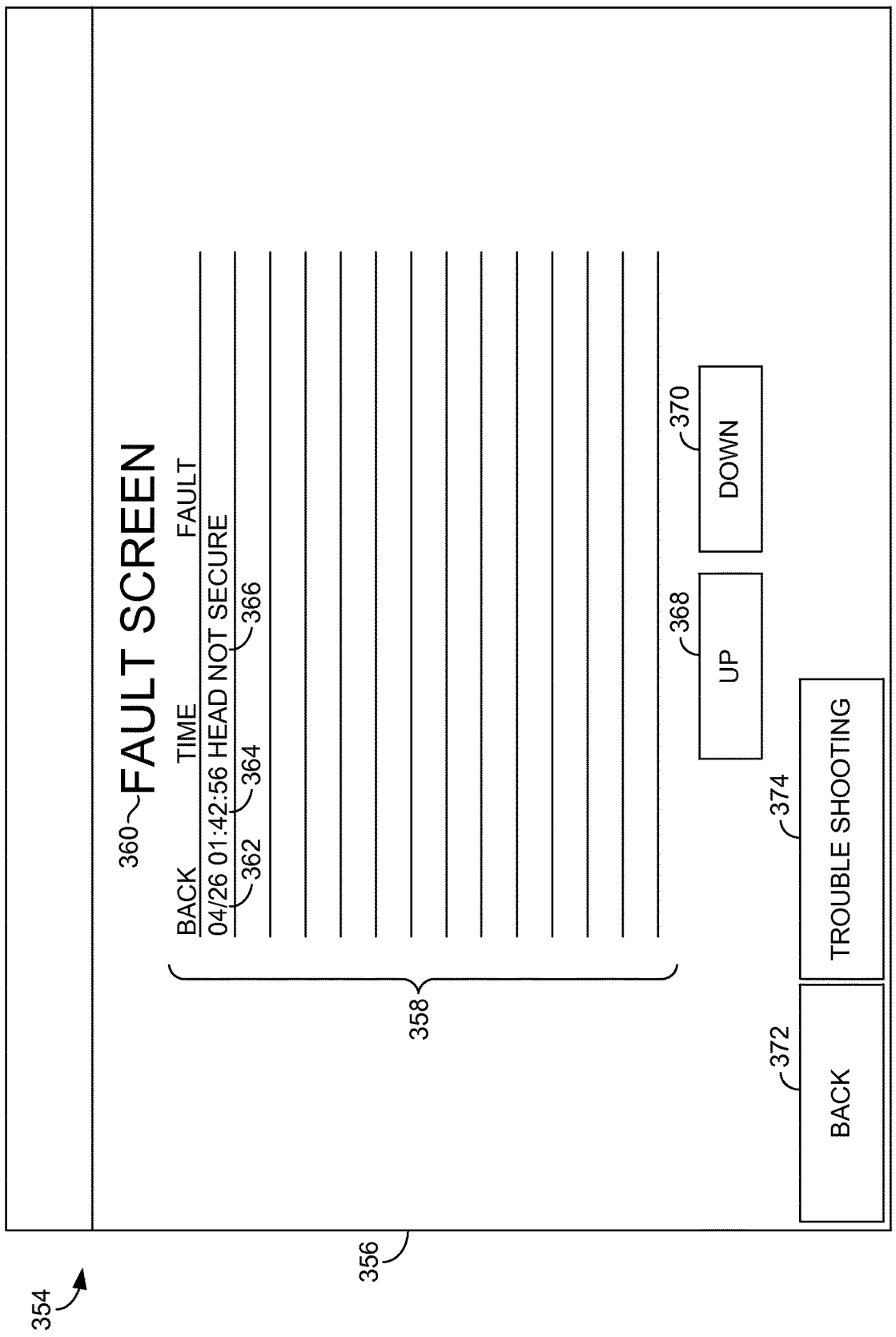
FIG. 18 is a display screen of an exemplary control user interface including a fault screen display, in accordance with an embodiment of the present invention.
Figure 19:
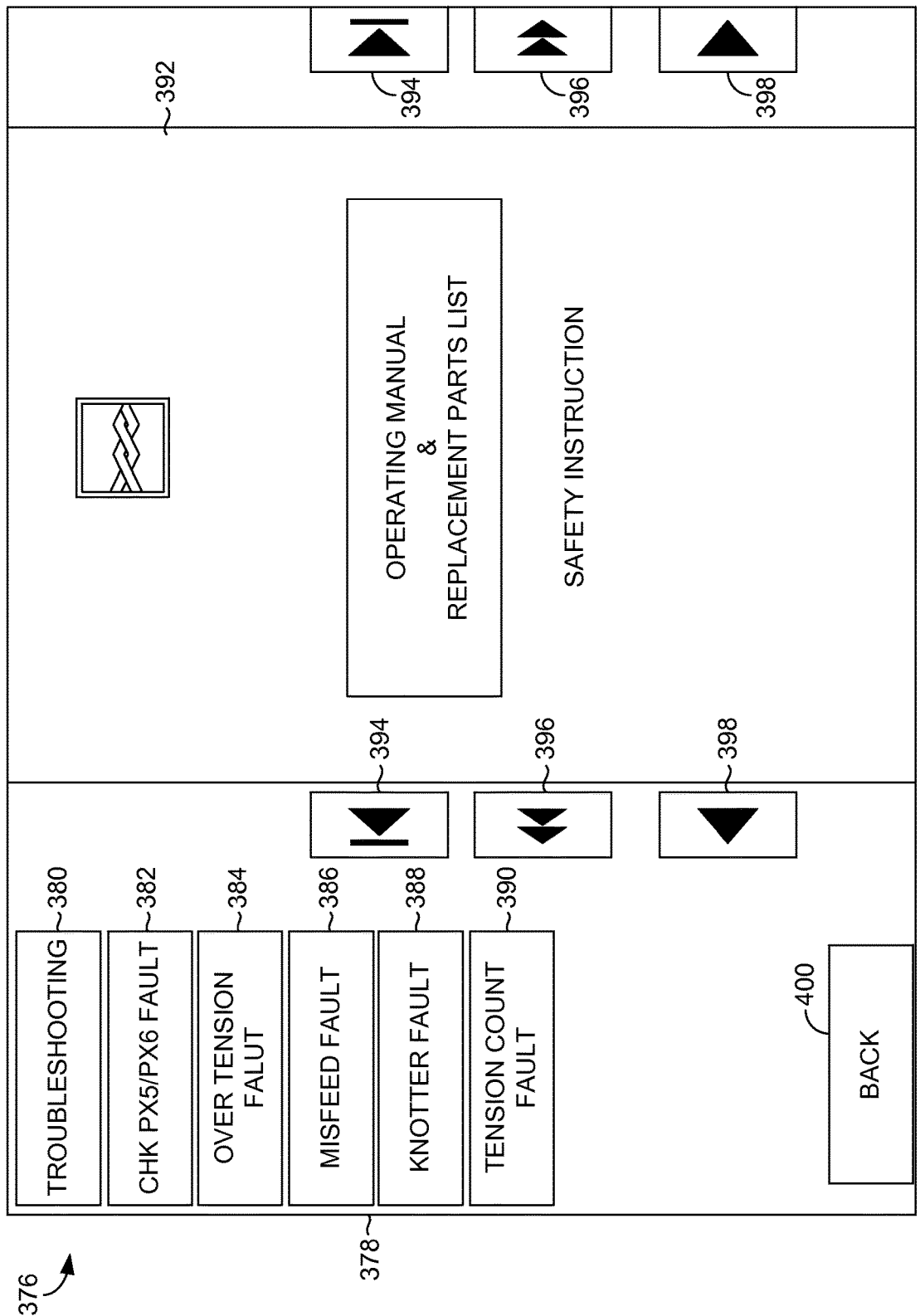
FIG. 19 is a display screen of an exemplary control user interface including a troubleshooting display, in accordance with an embodiment of the present invention.

In further embodiments of the invention, as shown in FIG. 18, a display screen of an exemplary control UI 354 including a fault screen display 356 is provided in accordance with an embodiment of the present invention. The fault screen display 356 may include a number of indicators 358 associated with a fault screen listing 360, including a date 362, a time 364, and a fault indication 366 for a number of faults associated with the wire tying system. In some embodiments, the fault screen listing 360 may be navigated using up and down indicators 368 and 370. In one aspect, a threshold number of time-date stamped fault indications 366 may be included in the fault screen listing 360 associated with a particular wire-tying system and/or a particular control system for multiple wire-tying systems.

Further, upon selection of the troubleshooting indicator 374, a control UI 376 having a troubleshooting display 378 may be presented to a user, as shown in FIG. 19. In embodiments, the troubleshooting display 378 may include a troubleshooting indicator 380, a PX5/PX6 fault indicator 382, an over tension fault indicator 384, a misfeed fault indicator 386, a knotter fault indicator 388, and a tension count fault indicator 390. Additionally, the troubleshooting display 378 may be configured to provide a visual representation of a troubleshooting manual 392, which may include various information such as an operating manual, a replacement part list, a set of safety instructions, and the like. In some aspects, the visual representation of a troubleshooting manual 392 is a searchable PDF image of one or more items of resource content related to the wire tying device, such as a series of PDF and/or scanned images of an operating manual, a replacement part list, and/or a set of safety instructions. As further shown in FIG. 19, the searchable features of the troubleshooting manual 392 may be accessed via various pairs of forward and backward advancing indicators 394, 396, and 398. In some aspects, one or more alarms from a run screen can be used to access one or more troubleshooting "shortcut" features of the troubleshooting display 378, such as the troubleshooting indicator 380, the PX5/PX6 fault indicator 382, the over tension fault indicator 384, the misfeed fault indicator 386, the knotter fault indicator 388, and the tension count fault indicator 390. Additionally, in further embodiments, one or more of the troubleshooting features of the troubleshooting display 378 may be accessed via one or more pages of the troubleshooting manual 392, such as a hyperlinked page of the troubleshooting manual 392 that directs a user to the same content as the corresponding shortcut, such as the over tension fault indicator 384.

Figure 20:
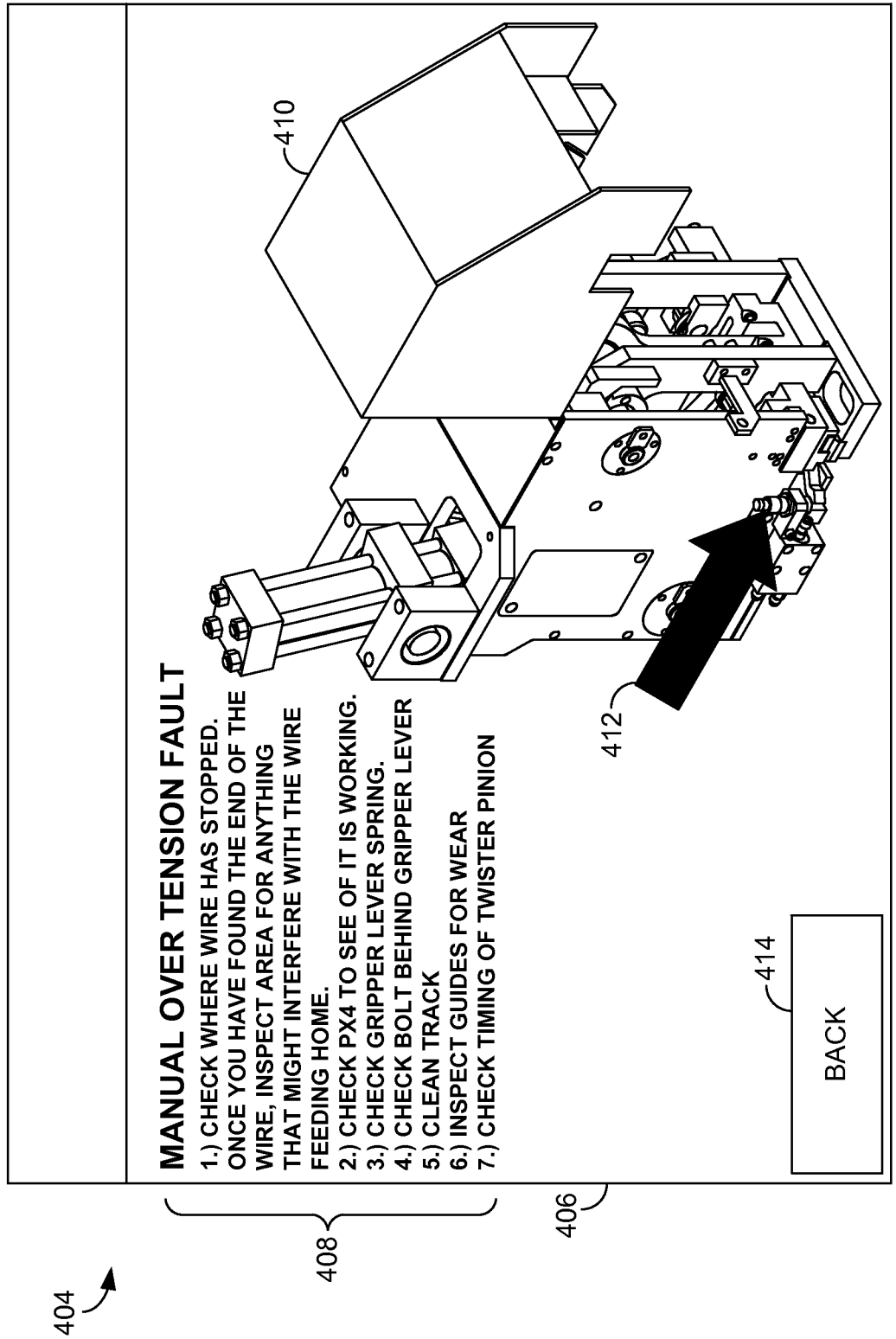
FIG. 20 is a display screen of an exemplary control user interface including a troubleshooting display, in accordance with an embodiment of the present invention.

In some embodiments, based on selection of one of the troubleshooting indicators 380, 382, 384, 386, 388, and 390, an additional troubleshooting interface may be presented to a user. For example, in response to selection of the over-tension fault indicator 384, a control UI 404 including a troubleshooting display 406 may be presented to a user, as shown in FIG. 20. In some embodiments, the troubleshooting display 406 includes one or more items of troubleshooting content 408, in context of a corresponding component image 410 and component indicator 412. In some aspects, a user may access the troubleshooting display 406 based on selection of an error message on a run screen of the control UI. In other aspects, the troubleshooting display 406 of FIG. 20 is accessed via an error indicator on the troubleshooting display 378 (e.g., the overtension fault indicator 384) and/or via one or more hyperlinked items of content within the troubleshooting manual 392. As such, a user may access the troubleshooting display 378 of FIG. 19 in response to a received indication from the troubleshooting indicator 374 of the fault screen display 356 in FIG. 18. In further embodiments, a user may access a control UI depicting one or more component images 410 on a troubleshooting display 406 that corresponds to a selected fault indicator from fault screen list 360 and/or corresponds to a selected item of content from the troubleshooting manual 392.

Figure 21:
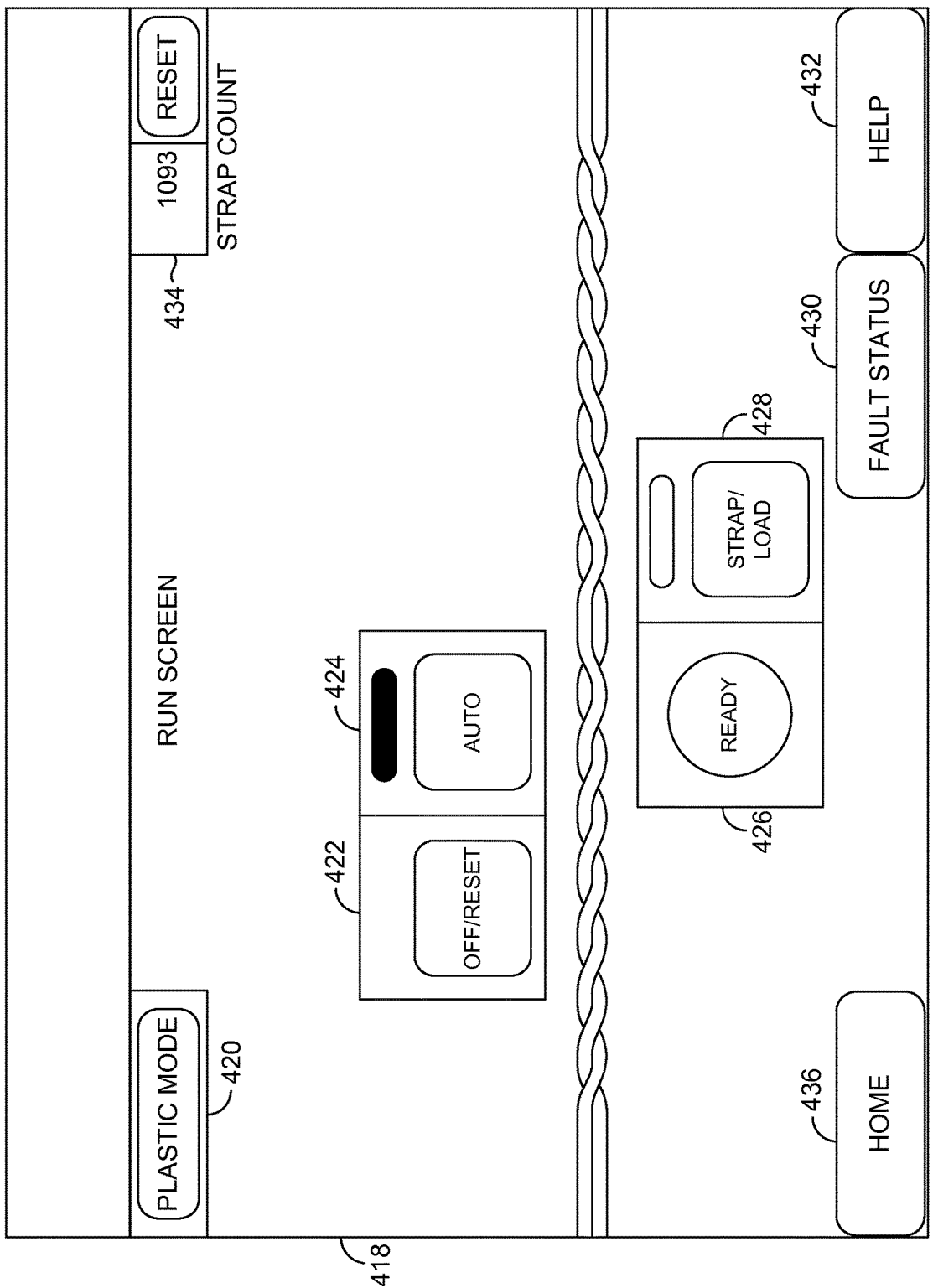
FIG. 21 is a display screen of an exemplary control user interface including a run screen for a plastic strapping system, in accordance with an embodiment of the present invention.

Referring finally to FIG. 21, an exemplary control UI including a run screen display 418 for a plastic strapping system is provided according to an embodiment of the present invention. In the example of FIG. 21, the run screen display 418 includes a plastic mode indicator 420, an off/reset selection indicator 422, an auto selection indicator 424, a ready status indicator 426, a strap/load selection indicator 428, a fault status selection indicator 430, a help indicator 432, a strap count indicator 434, and a home indicator 436. In some embodiments, various features of a plastic strapping odometer may be utilized to provide a strap count for strap count indicator 434, which may include information regarding a linear footage of plastic consumed during cycling of the strapping machine. Similarly, various features of a troubleshooting manual and/or fault status listing may be accessed in response to selection of the fault status indicator 430. In some aspects, the run screen display 418 may be configured to activate the automatic strapping of a plastic strap around a perimeter of a baled material, in response at least to a received indication of selection of the strap/load indicator 428.

In some embodiments of the invention, a user of a wire-tying system controlled by the control system having one or more of the control UI's depicted in the above figures may monitor, in real-time, one or more features of the system that potentially impact the productivity, speed, and efficiency of the overall system. In some aspects, the user is notified of a diminished number of straps remaining on a carrier, and therefore prompted to replace the wire carrier in a timely manner. In further aspects, one or more features of the control system may be remotely monitored to provide the retrieval of data, such as wire usage data and/or maintenance data. In some aspects, a maintenance technician may retrieve wire usage data and/or maintenance data remotely, without having to interact physically with the wire-tying system and/or interact directly with the control UI. In some embodiments, a touchscreen interface is provided for a wire (or plastic/wire) tying machine, providing wire odometer features for monitoring a length of remaining wire on a carrier and the corresponding number of straps remaining on a carrier, and also for providing troubleshooting and/or maintenance monitoring features for parts life expectancy and/or error messages during machine operation.

The present invention has been described in relation to particular embodiments, which are intended in all respects to be illustrative rather than restrictive. Alternative embodiments will become apparent to those skilled in the art to which the present invention pertains without departing from its scope.

It will be seen from the foregoing that this invention is one well adapted to attain the ends and objects set forth above, and to attain other advantages, which are obvious and inherent in the device. It will be understood that certain features and subcombinations are of utility and may be employed without reference to other features and subcombinations. This is contemplated by and within the scope of the claims. It will be appreciated by persons skilled in the art that the present invention is not limited to what has been particularly shown and described hereinabove. Rather, all matter herein set forth or shown in the accompanying drawings is to be interpreted as illustrative and not limiting.

What is claimed is:

1. A control system for operating a material strapping device, the control system comprising:
   a control system component having one or more processors and one or more computer storage media, wherein the control system component:
      determines a number of straps remaining on a consumable wire carrier of the material strapping device, and
      identifies an amount of life remaining for at least one part coupled to the material strapping device,
   a wire odometer display configured to present an amount of remaining wire on said consumable wire carrier coupled to the material strapping device;
   a parts monitoring display configured to present remaining use expectancy indicators corresponding to the at least one part coupled to the material strapping device;
   a consumable wire carrier weight indicator;
   and said consumable wire carrier weight indicator includes real-time weight information received from a weighing apparatus coupled to the control system, and
   wherein a wire gauge of a wire being measured by the consumable wire carrier weight indicator corresponds to a particular weight per foot for the wire based on a wire material.

2. The control system of claim 1, wherein the control system determines the number of straps remaining on the consumable wire carrier based at least in part on the amount of remaining wire on the consumable wire carrier and an average bale perimeter length.

3. The control system of claim 1, wherein the amount of remaining wire on the consumable wire carrier is determined based at least in part on 1) the consumable wire carrier weight indicator, 2) a wire gauge of the remaining wire on the carrier, and 3) an amount of wire consumed by the material strapping device during strapping.

4. The control system of claim 1, wherein identifying the amount of a life remaining for at least one part comprises comparing a number of cycles run by the material strapping device to an expected number of cycles associated with the at least one part.

5. The control system of claim 4, wherein in response to identifying the amount of life remaining for the at least one part, an alert is presented to a user corresponding to an identified amount of remaining life for the at least one part that is at or below a threshold level.

6. The control system of claim 1, wherein the remaining use expectancy indicators are determined based at least in part on 1) an identified expectancy corresponding to the at least one part, and 2) a cycle number.

\* \* \* \* \*